US011230400B2

(12) United States Patent
Diaz Guerrero

(10) Patent No.: US 11,230,400 B2
(45) Date of Patent: Jan. 25, 2022

(54) METHOD, DEVICE AND SYSTEM FOR FILLING PHARMACEUTICAL CONTAINERS

(71) Applicant: VANRX PHARMASYSTEMS INC., Burnaby (CA)

(72) Inventor: Carlos Alberto Diaz Guerrero, Burnaby (CA)

(73) Assignee: V ANRX PHARMASYSTEMS INC., Burnaby (CA)

( * ) Notice: Subject to any disclaimer, the term of this patent is extended or adjusted under 35 U.S.C. 154(b) by 544 days.

(21) Appl. No.: 16/003,166

(22) Filed: Jun. 8, 2018

(65) Prior Publication Data

US 2019/0337658 A1 Nov. 7, 2019

Related U.S. Application Data

(60) Provisional application No. 62/667,661, filed on May 7, 2018.

(51) Int. Cl.

| | |
|---|---|
| ***B65B 7/02*** | (2006.01) |
| ***B65B 57/02*** | (2006.01) |
| ***B65B 3/00*** | (2006.01) |
| ***B65B 7/28*** | (2006.01) |
| ***B65B 63/08*** | (2006.01) |
| ***B65B 55/08*** | (2006.01) |
| ***B65B 55/02*** | (2006.01) |
| ***B65B 55/10*** | (2006.01) |

(52) U.S. Cl.

CPC .............. *B65B 57/02* (2013.01); *B65B 3/003* (2013.01); *B65B 7/2821* (2013.01); *B65B 55/027* (2013.01); *B65B 55/08* (2013.01); *B65B 55/10* (2013.01); *B65B 63/08* (2013.01)

(58) Field of Classification Search

CPC ........... B65B 3/00; B65B 3/003; B65B 57/02; B65B 7/17; B65B 7/28; B65B 7/2807; B65B 7/2821; B65B 7/2842; B65B 55/027

See application file for complete search history.

(56) References Cited

U.S. PATENT DOCUMENTS 7,765,776 B1 * 8/2010 Leu ........................ B65C 9/1876 53/467
2017/0121046 A1 * 5/2017 Diaz ..................... B65B 55/027

* cited by examiner

*Primary Examiner* — Chelsea E Stinson

(74) *Attorney, Agent, or Firm* — Kevin R. Erdman; Brannon Sowers & Cracraft PC

(57) ABSTRACT

The present invention involves both an apparatus and an associated method for confirming the presence or absence of closures in a closure nest inside an aseptic chamber. The apparatus comprises a topographical profiler disposed to monitor the closure nests. Vertical displacements in topographical maps obtained by the profiler are compared with information from a database about the nest and closure combinations. Vertical displacements falling outside predetermined upper and lower bounds are deemed absences of closures. The topographical profiler may be disposed outside the aseptic chamber. The system may be automated via a controller and suitable software. In some embodiments the nests and disposed in the monitored area by robotic articulated arms. In other embodiments the closure nests are moved by vacuum pickup systems. The system and method may also be employed to assess the suitability of a closure nest for closing in an aseptic chamber containers in a container nest.

20 Claims, 13 Drawing Sheets

28 53 37 45 41 43 20 49 35 29 47a 39 100 47b 51

METHOD, DEVICE AND SYSTEM FOR FILLING PHARMACEUTICAL CONTAINERS

CROSS-REFERENCE TO RELATED APPLICATIONS

This nonprovisional application claims priority under 35 U.S.C. § 119(e) from U.S. Provisional Patent Application Ser. No. 62/667,661, filed May 7, 2018. This application is also related to U.S. application Ser. No. 14/912,145, which is a US national phase application for PCT application no. PCT/US14/51223, which claims priority to U.S. provisional application No. 61/867,014. The disclosures of all of these applications are incorporated by reference in their entirety.

TECHNICAL FIELD OF THE INVENTION

This present invention relates to the medical field as exemplified by IPC class A61 and more particularly to a device, system and method for filling and sealing of pharmaceutical containers. In particular, it relates to a device, system and method for filling and sealing of pharmaceutical containers within a controlled environment chamber.

BACKGROUND

By its very nature, the production of sterile pharmaceuticals by humans can be problematic. Humans can be a large source of microbial contamination. Also, with increased potencies, some drugs can be hazardous in occupational exposure. For at least these reasons, robotics is attractive in dosage manufacturing to limit human contact. Isolator technology, which provides a solid barrier between a process and humans, can also be used in dosage manufacturing to limit human contact.

Traditionally equipment for filling, stoppering and capping of pharmaceutical containers was designed to process singulated containers and typically employed vibratory bowls for the supply of elastomeric closures and shrink caps. More recently, equipment has become available to process multiple containers in nested arrangements. Such container arrangements can be cleaned, depyrogenated, and sterilized at the site of the container manufacturer. This simplifies the equipment requirements and operations of the pharmaceutical manufacturer.

A significant portion of all filling equipment is of such complexity that it cannot be integrated in a controlled environment enclosure. Such filling equipment can only be installed in a restricted access barrier system; which environment is much less secure than complete physical barrier provided by a controlled environment enclosure such as an isolator. The other negative aspect of complex equipment is cleanability, which can be a concern for multi-product use and in particular for highly potent products. In particular, systems employing conveyor belts to convey nested containers are known, and these present considerable challenges as regards cleaning to a degree acceptable in the pharmaceutical industry.

The handling and singulation of elastomeric stoppers and aluminum crimp caps is known to be problematic at times. Blockages of vibratory chutes cannot be prevented at all times and require operator interventions from time to time to free blockages. This has led to the use of nested pharmaceutical containers.

Some of the newer filling equipment accepts the nested containers, but then denests the containers to processes them in a singulated fashion, exactly as happens in the traditional equipment. They thereby forego some of the inherent benefits provided in the first place by the nesting of the containers. Other equipment variants denest the elastomeric closures and aluminum crimp caps before then applying them in singulated fashion.

It is good practice in automation not to let go of a part such as a pharmaceutical container or closure once it is properly held and to only let go of the part once any processing involving the part is completed. Most prior art vial filling machine designs deviate from this rule, because of perceived difficulties in placing of stoppers and caps when containers are located in a nest.

Another good practice is to avoid unnecessary handling of parts under aseptic conditions. Stopper and closure elements are typically singulated in industry using vibratory bowls and transported using vibratory chutes. The vibratory bowl and chutes contact the stoppers, the surfaces of which will eventually be in direct contact with the product inside the container. To address this problem, it is generally considered necessary to steam sterilize the vibratory bowls and chutes. However, is practically impossible to transfer the stopper bowl and chutes aseptically from the sterilizing autoclave to the processing environment.

As regards the design of particular closure nests, an example of a prior art vial closure nest is described in US 20120248057 A1. The particular example is limited in practical applications for at least three reasons.

Firstly, commercially available trays typically have 60-120 containers, the quantity varying with vial diameter. The packing density of 60-120 containers with a foot print of 8"×9" in a nest does not allow for a matching cap nest design as shown in US 20120248057 A1, because its holding features take up too much space. The force required for capping for each vial is typically in the range of 40-50N, and is therefore an order of magnitude larger than the force required for removal of the tamper evident feature shown in the same patent application.

Secondly the closure has to be held by the nest in such a way that the force required for capping of the vial is directed without a resulting force vector acting on the tamper evident feature. When considering simultaneous capping, the forces can add up to 6000N, further stressing the need for a closure nest design that does not distort or flex under load.

Thirdly, the closure needs to be held in the nest in such a way that its accidental release is prevented during transport and handling, yet it should allow for the cap to be removed without risk of removing the tamper evident feature.

Fourthly, the system and closure nest must both be configured to allow inspection of the closure nest to ensure that there is indeed a closure in each closure location in the closure nest.

In summary, while the use of nested containers has been established in industry, challenges remain as to how to manage such containers within a controlled environment while ensuring that the equipment used in the process is cleanable to a degree acceptable in the pharmaceutical industry, an industry in which regulations are exceptionally stringent.

SUMMARY

In a first aspect this disclosure provides method for aseptically filling a first plurality of containers with a pharmaceutical product in a first controlled environment enclosure, the method comprising: decontaminating at least one of first and second sealed nested materials in a first transfer chamber; placing the first controlled environment enclosure in spatial communication with the first transfer chamber; aseptically gripping the at least one of first and second sealed nested materials; transferring the at least one of first and second sealed nested materials to the controlled environment enclosure; removing from one of the first and second sealed nested materials a container nest holding the first plurality of containers and removing from the other of the first and second sealed nested materials a closure nest releasably retaining a plurality of closures; filling the first plurality of containers with the pharmaceutical product in the first controlled environment enclosure; and at least partially closing the first plurality of containers with the plurality of closures. The method may further comprise maintaining aseptic conditions in the first controlled environment chamber and weighing the first plurality of containers while it is in the container nest.

The first plurality of containers may be in the closure nest during the at least partially closing. The aseptically gripping may comprise manipulating a first articulated arm apparatus. The closing of the first plurality of containers may comprise manipulating an articulated arm apparatus to place the first plurality of containers in a stoppering apparatus. The filling may comprise manipulating a second articulated arm apparatus. The filling of the first plurality of containers may comprise filling simultaneously at least a portion of the first plurality of containers.

The filling of the first plurality of containers may comprise manipulating an articulated arm apparatus to move one of the container nest and a fill needle system dispensing the pharmaceutical product. The dispensing of the pharmaceutical product may comprise dispensing the pharmaceutical product simultaneously from a plurality of fill needles. The removing of the container nest holding the first plurality of containers may be by manipulating a second articulated arm apparatus.

The method may further comprise returning the filled containers to the transfer chamber and terminating the spatial communication between the transfer chamber and the first controlled environment chamber.

The at least partially closing the first plurality of containers may comprise partially inserting the plurality of in the first plurality of containers; lyophilizing the pharmaceutical product in the first plurality of containers; and at least partially sealing the first plurality of containers by exerting pressure on at least a portion of a plurality of caps associated with the plurality of stoppers. The lyophilizing the pharmaceutical product may comprise lyophilizing the pharmaceutical product in a stoppering apparatus having an interior that may be isolated from the interior of the first controlled environment enclosure.

The partially closing of the first plurality of containers may comprise simultaneously partially closing at least a portion of the first plurality of containers. In other embodiments, the partially closing the first plurality of containers may comprise partially closing all the containers in the container nest simultaneously.

The at least partially closing may comprise completely closing and the method may further comprise transferring the filled containers to a second controlled environment enclosure. In some embodiments the partially sealed first plurality of containers may also be transferred to a second controlled environment chamber.

In another aspect the disclosure provides a method for aseptically sealing a pharmaceutical product into a plurality of containers, the method comprising: introducing a first plurality of containers into a controlled environment enclosure; releasably suspending from a closure nest in the controlled environment a plurality of aseptic closures; filling at least a first portion of the first plurality of containers with the pharmaceutical product; and simultaneously sealing at least partially a second portion of the first plurality of containers with a portion of the plurality of aseptic closures while releasably retaining the aseptic closures in the closure nest. The method may further comprise lyophilizing the pharmaceutical product in the second portion of the first plurality of containers while releasably retaining the aseptic closures in the closure nest.

The releasably suspending and releasably retaining may comprise releasably engaging with a holding feature of each of the plurality of aseptic closures. The releasably engaging with the holding feature may comprise elastically engaging with the holding feature. The elastically engaging with the holding feature may comprise engaging the holding feature with a spring-loaded retaining structure portion of the closure nest.

Some or all of the plurality of the aseptic closures retained by the closure nest may be used to either fully or partially seal the pharmaceutical product into the containers. The plurality of containers may be equal in number to the number of aseptic closures releasably suspended by the closure nest. Two or more containers may be filled simultaneously.

In another aspect this disclosure provides a closure nest for releasably retaining a plurality of closures for pharmaceutical containers, the closure nest comprising a plurality of closure retaining structures each comprising at least one spring-loaded retaining structure arranged to engage with a holding feature on one of the plurality of closures. The closure retaining structures may each further comprise a stop structure configured to exert force on and confine the one of the plurality of closures.

The at least one spring-loaded retaining structure may be monolithically integrated with the closure nest and the closure nest may be a polymeric closure nest. The at least one spring-loaded retaining structure may be a flexible retaining structure and, in some embodiments, the flexible retaining structure may be a polymeric structure. The plurality of closure retaining structures may be arranged in a geometric pattern and, in some embodiments, the geometric pattern may be a close packed pattern. The geometric pattern may match center-to-center a pattern of container-holding structures on a container nest.

In a further aspect an apparatus is provided for confirming the presence or absence of closures in a closure nest inside an aseptic chamber, the apparatus comprising: a topographical profiler disposed to monitor a monitored area inside the aseptic chamber; a nest handler disposed inside the chamber for moving the closure nest into the monitored area, the nest having a surface; a database of predetermined ranges of vertical displacements having lower and upper bounds in areas of the closure nest where closures are expected to be present, the data covering different combinations of nests and closures; a controller in data communication with the topographical profiler, the controller comprising a memory and a processor; and software comprising instructions that when loaded in the memory and executed by the processor instructs the topographical profiler to scan the monitored area, return to the controller a topographical profile map of the closure nest comprising vertical displacement data versus two mutually perpendicular directions in a plane of the surface, compares the vertical displacement data with data for the nest and closures from the data base, and deems a closure present or absent based on the comparison.

The topographical profiler may be disposed outside the aseptic chamber. The nest handler may be an articulated arm apparatus. The articulated arm apparatus may be a robotic articulated arm apparatus. The nest handler may be a vacuum pickup system.

In a further embodiment an apparatus is provided for confirming in an aseptic chamber the suitability of a closure nest for use in closing containers in a container nest, the apparatus comprising: a topographical profiler disposed to monitor a monitored area inside the aseptic chamber; a nest handler disposed inside the chamber for moving the closure nest into the monitored area, the nest having a surface; a database of predetermined ranges of vertical displacements having lower and upper bounds, the data covering different closure nests; a controller having access to the database and in data communication with the topographical profiler, the controller comprising a memory and a processor; and software comprising instructions that when loaded in the memory and executed by the processor instructs the topographical profiler to scan the monitored area, return to the controller a topographical profile map of the closure nest comprising vertical displacement data versus two mutually perpendicular directions in a plane of the surface, compares the vertical displacement data with data for the nest from the data base, and deems a closure nest suitable or unsuitable based on the comparison.

The topographical profiler may be disposed outside the aseptic chamber. The nest handler may be an articulated arm apparatus. The articulated arm apparatus may be a robotic articulated arm apparatus. The nest handler may be a vacuum pickup system.

In a further aspect a method is provided for confirming the presence or absence of closures in a closure nest inside an aseptic chamber, the method comprising: disposing the closure nest in a monitored area inside an aseptic chamber, the nest having a surface; operating a topographical profiler to obtain a topographical profile map of the closure nest comprising vertical displacement data versus two mutually perpendicular directions in the plane of the surface; comparing the vertical displacement data with a predetermined range of vertical displacements having a lower bound and an upper bound in areas of the closure nest where closures are expected to be present; deeming a closure to be present if the vertical displacement data is between the lower and upper bounds; and deeming a closure to be absent if the vertical displacement data is not between the lower and upper bounds.

Deeming a closure to be present if the vertical displacement data is between the lower and upper bounds may comprise deeming a stopper to be present if the vertical displacement data is between the lower and upper bounds. Deeming a closure to be absent if the vertical displacement data is not between the lower and upper bound may comprise deeming a stopper to be present if the vertical displacement data is between the lower and upper bounds.

In another aspect a method is provided for confirming the suitability of a closure nest for use in closing a nest of containers, the method comprising: disposing the closure nest in a monitored area inside the aseptic chamber, the nest having a surface; operating a topographical profiler to obtain a topographical profile map of the closure nest comprising vertical displacement data versus two mutually perpendicular directions in the plane of the surface; comparing the vertical displacement data with a predetermined range of acceptable vertical displacements having a lower bound and an upper bound; deeming the closure nest to be suitable if the vertical displacement data is between the lower and upper bounds; and deeming the closure nest to be unsuitable if the vertical displacement data is not between the lower and upper bounds.

The method may further comprise upon deeming the nest to be unsuitable discarding the nest and disposing another nest with closures in the monitored area.

BRIEF DESCRIPTION OF THE DRAWINGS

The drawings illustrate generally, by way of example, but not by way of limitation, various embodiments discussed in the present document.

Figure 1:
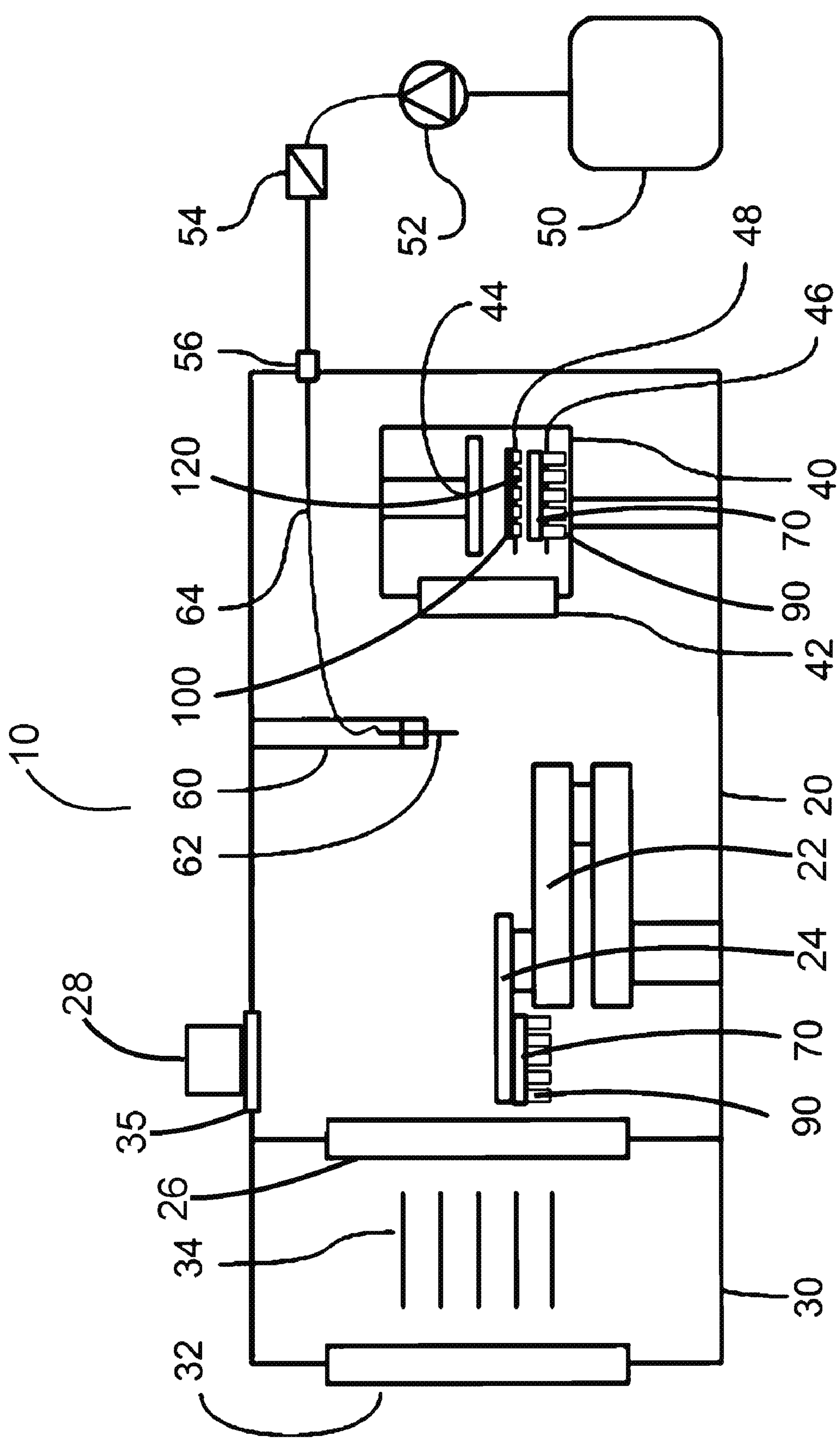
FIG. 1 shows a system for filling pharmaceutical containers.

Corresponding reference characters indicate corresponding parts throughout the several views. Although the drawings represent embodiments of the present invention, the drawings are not necessarily to scale and certain features may be exaggerated in order to better illustrate and explain the present invention. The flow charts are also representative in nature, and actual embodiments of the invention may include further features or steps not shown in the drawings. The exemplifications set out herein illustrate embodiments of the invention, in one or more forms, and such exemplifications are not to be construed as limiting the scope of the invention in any manner.

DETAILED DESCRIPTION

Figure 2:
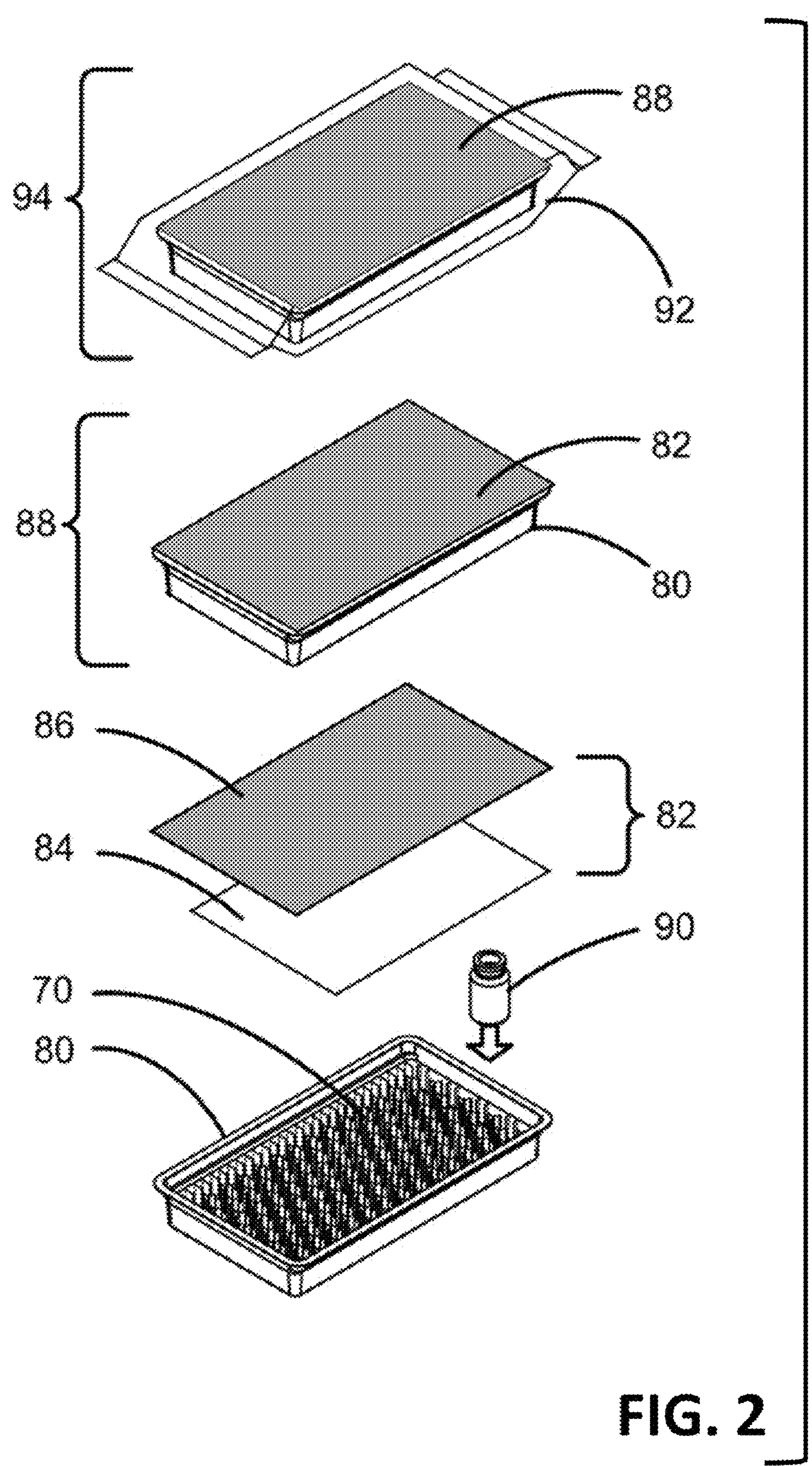
FIG. 2 shows from bottom to top the arrangement and contents of a sealed nested container package as employed in the present invention.
Figure 3:
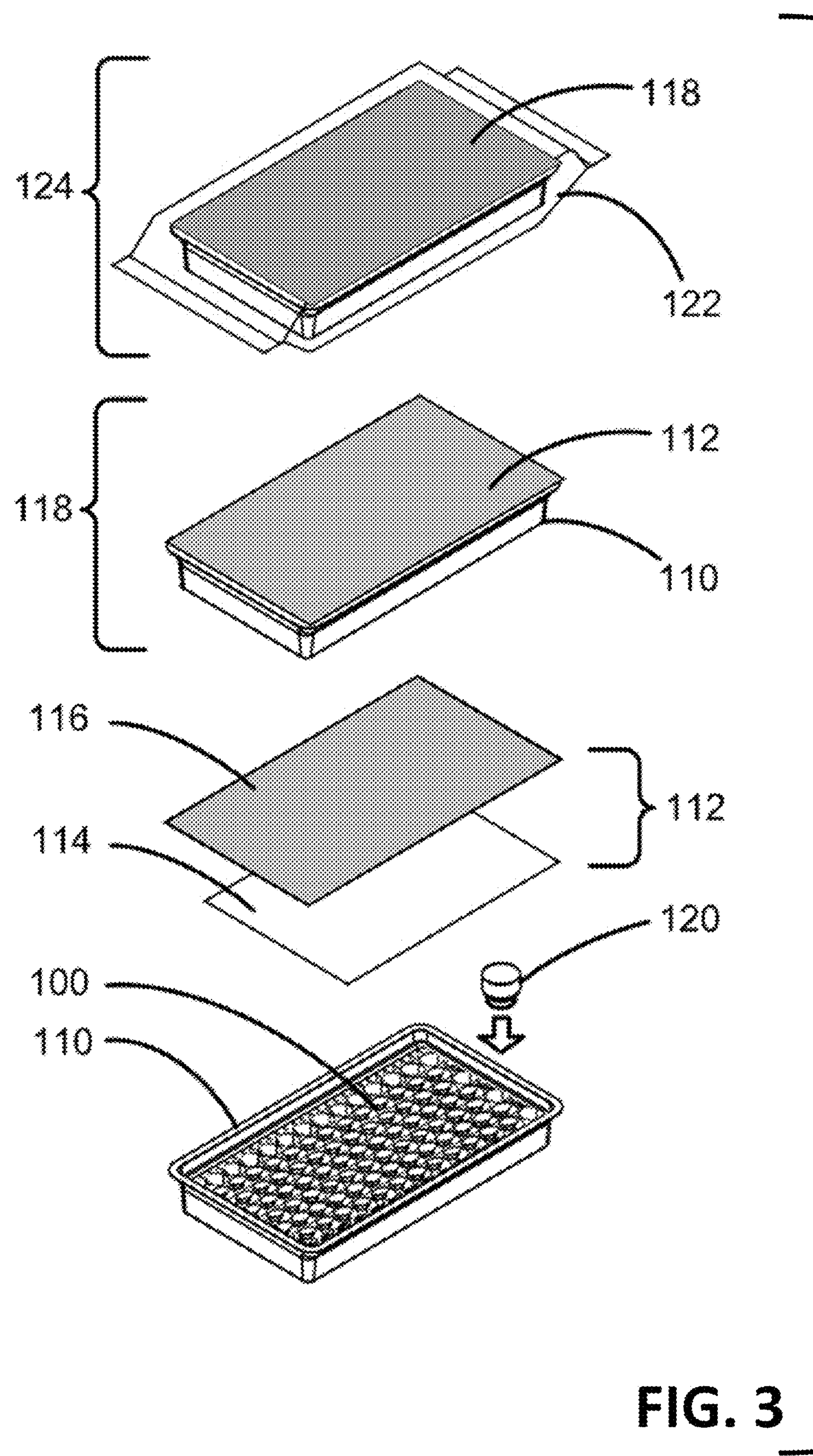
FIG. 3 shows from bottom to top the arrangement and contents of a sealed nested closure package as employed in the present invention.

A method and associated system for filling pharmaceutical containers is described at the hand of the schematic depiction in FIG. 1, as well as FIG. 2 and FIG. 3. A filling system 10 for filling pharmaceutical containers 90 with a pharmaceutical product is disposed within a controlled environment enclosure 20. Controlled environment enclosure 20 is configured for maintaining an aseptic or sterile condition.

The terms "aseptic" and "sterile" and their derivatives are to be understood as follows for the purposes of the present specification. Establishing an aseptic condition in the interior of a chamber shall be understood to mean establishing that condition throughout the internal atmosphere of the chamber as well as on substantially all exposed interior surfaces of the chamber. This shall include the surfaces of all items, containers, subsystems and the like exposed to the interior atmosphere of the chamber. To the extent that extremely tight crevices or microscopic crevices may exist in the interior of the chamber such that a sterilizing gas or vapor may not perfectly penetrate into such tight regions, the degree of sterilization will in practical cases never be total. This is acknowledged both in industry and in the standards set for industry. The action of establishing an aseptic condition within the interior of the chamber and "sterilizing the interior of the chamber" shall have the same meaning in this specification.

Introducing into the interior of a chamber with an aseptic condition an item of which the surfaces are not suitably sterilized destroys the existing aseptic condition within the chamber. Conversely, introducing an aseptic or sterilized item into an interior of a chamber that does not have an aseptic condition within that interior does not render that interior aseptic. In fact, all it does is to destroy the aseptic condition of the surface of the item so introduced. Similarly, introducing filtered air, even with all biological entities filtered out, into an unsterilized chamber does not in any way sterilize the chamber or render it aseptic to a degree acceptable in the pharmaceutical industry. The reason is that the interior surfaces of the chamber are not sterilized by the introduction of such air. All that is achieved is to contaminate the filtered air with active biological species resident on the interior surfaces of the unsterilized chamber.

In the interest of clarity and completeness, it should also be recorded that in the art the term "aseptic" is also sometimes used in association with the introduction of pharmaceutical fluids along aseptic tubes into bodies within controlled chambers. In such cases the term in the art refers to the condition inside the tube or to the fact that the pharmaceutical fluid may be filtered to a suitable degree. This in no way sterilizes or renders aseptic the interior of the chamber in question. The aseptic condition in such cases is confined to the interior of the tube bearing the pharmaceutical stream. Such streams are often filtered to a high degree, but such filtering affects only the interior of the particular tube and does not in any way sterilize the interior of the chamber.

In some prior art systems, containers introduced into a chamber for the purposes of being filled with a pharmaceutical are routed through sterilizing subsystems. This kills biological species on the containers. When such sterilized containers are introduced into the chamber when the chamber itself is not aseptic the containers lose their aseptic condition as biological species contained within the chamber will deposit on the previously aseptic containers.

It should also be pointed out that pharmaceutical or semiconductor clean rooms of any quality level, including "Class 100", "Class 10" or "Class 1", even when employing laminar flow hoods and the like or any quality of HEPA (High Efficiency Particulate Air) filters or ULPA (Ultra Low Particulate Air) filters, cannot constitute an aseptic chamber because they do not have an assurable means to render the surfaces of the room sterile or aseptic. Standards for clean rooms exist from both the United States Federal Government and ISO (International Standards Organization). These specify in great detail to different standards the allowed particulate content of a cubic volume of air in such a clean room facility. None of these standards address the matter of biological species present on surfaces in the room. This serves to make the point that a chamber cannot be rendered aseptic by the management of its atmosphere or airflow only. Nor, conversely, can the chamber be rendered aseptic by the sterilization of only the surfaces of its interior.

The text "Guideline for Disinfection and Sterilization in healthcare Facilities, 2008" by Rutala et al from the United States Center for Disease Control lists a compendium of mechanisms and methods for sterilization. Our concern in this specification is specifically with those mechanisms for sterilizing the interior of a chamber; that is, sterilizing both the interior surfaces and the atmosphere within the chamber. Given the requirements, vapor base methods are most appropriate to the task. These include, but are not limited to, treatment with heated water vapor, hydrogen peroxide vapor, ozone, nitrogen dioxide, ethylene oxide, glutaraldehyde vapor or other suitable sterilizing gases and vapors. In one suitable method appropriate to the present invention, the sterilization is by means of hydrogen peroxide vapor which is then flushed using ozone before the chamber is employed in the filling of pharmaceutical containers.

In some embodiments, in particular that shown in FIG. 1, the pharmaceutical product may be a liquid product. In other embodiments, the product may be a solid pharmaceutical product. The pharmaceutical product may potentially be toxic or otherwise harmful. As will be described in more detail below, filling system 10 may be configured to locate, target, and fill containers 90 held in container nest 70 within container tub 80 (see FIG. 2). Many types of containers 90 are contemplated herein, including, but not limited to vials, syringes, cartridges, bottles, and ampoules. The closures to be addressed herein below similarly are contemplated to be closures for containers that include but are not limited to vials, syringes, cartridges, bottles, and ampoules.

Pharmaceutical containers made from tubular glass are commercially available in a range of different sizes with dimensions according to the DIN/ISO 8362-1 standard. Molded glass vials are commercially available in a range of different sizes with dimensions according to the DIN/ISO 8362-4 standard. Frequently vials are used that have one or more additional custom specifications. In some cases these specifications may deviate from the standards.

Glass has traditionally been the only choice for container material but problems with glass breakage, delamination, particulates due to glass-on-glass collisions, and stability of some products resulted in development and usage of suitable polymeric materials. One example of such polymeric material is TOPAS(R) cyclic olefin polymer. Vials made of polymeric materials are commercially available in size ranges and dimensions that typically closely mimic those of glass vials.

Polymeric materials are significantly less scratch resistant than glass and existing aseptic processing equipment has not been redesigned to mitigate the risks of scratching. Scratched surfaces of containers are a serious concern for the perceived quality of the product, but also severely limits the inspection of the containers for particulates. Such inspection is typically a regulated requirement for good manufacturing practice.

Processing of vials in nests may be an effective solution to prevent scratching of vials such as typically occurs during singulated handling of vials or during simultaneous handling of rows of vials. Handling of vials in nests avoids all vial-tooling and vial-vial collisions. The nests are particularly well suited for processing of polymeric vials but may be used equally well for processing of glass vials.

Nests for syringes have been commercially available for some decades, but they are a comparatively new concept for the management of pharmaceutical containers beyond syringes. Suitable container nests 70 are available from Nuova Ompi of Newtown, Pa. and from Afton Scientific of Charlottesville, Va.

Containers 90, tub 80, and container nest 70 are shown in more detail in FIG. 2 in which the packaging of containers 90 is depicted in stages of completeness from bottom to top. Container nest 70 and container tray or tub 80 may be, for example without limitation, of the polystyrene EZ-FILL® type provided by Nuovo Ompi of Newtown, Pa. (EZ-FILL® is a registered trademark of NUOVA OMPI of Piombino Dese (PD), Italy). These are typically supplied with sealing cover 82 permeable to ethylene oxide for purposes of sterilization. Cover 82 may comprise of a permeable sheet 84 and lid 86 over permeable sheet 84, all of which may be made of Tyvek® material (TYVEK® is a registered trademark of E. I. Du Pont De Nemours and Company Corporation of Wilmington Del.). In the present specification we refer to the combination of tub 80, sealed with cover 82 and containing the nest 70 with containers 90 as "sealed nested container materials" 88. Sealed nested container materials 88 may be supplied packaged in steri-bag 92. In the present specification we refer to this entire combination, as shown in FIG. 2, as a "sealed nested container package" 94.

Closures 120 for containers 90 may be supplied in similar fashion to containers 90, as shown in FIG. 3. The closures may comprise caps 130 with integrated stoppers 140 and are described in more detail below at the hand of FIG. 6 and FIG. 7. Closures 120 are supplied arrayed within closure nest 100 in closure tub 110 with sealing cover 112 permeable to ethylene oxide for purposes of sterilization. Cover 112 may comprise of sheet 114 and lid 116 over the permeable sheet 114 all of which may be made of Tyvek® material (TYVEK® is a registered trademark of E. I. Du Pont De Nemours and Company Corporation of Wilmington Del.). In the present specification we refer to the combination of tub 110, sealed with cover 112 and containing closure nest 100 with closures 120 as "sealed nested closure materials" 118. Sealed nested container materials 118 may be supplied packaged in steri-bag 122. In the present specification we refer to this entire combination, as shown in FIG. 3, as "sealed nested closure package" 124. In the present specification sealed nested container materials 88 and sealed nested closure materials 118 are collectively referred to as "sealed nested materials."

Tubs 80, 110 may be handled within controlled environment enclosure 20 by articulated arm apparatus 22 disposed within controlled environment enclosure 20. Articulated arm apparatus 22 comprises end of arm tool 24 configured to hold tubs and nests. Articulated arm apparatus 22 may be, without limitation, a robotic articulated arm. Suitable robotic articulated arms are described in US Patent Application Publication US 2009/0223592A1 and in WIPO PCT Application Publication Number WO 2013/016248A1, the disclosures of which are both wholly incorporated herein by reference.

In contrast to prior art conveyor belt systems, tubs 80, 110 and nests 70, 100 are gripped and held by end of arm tool 24, which may be capable of gripping or holding. Furthermore, as described in patent application US2009/0223592A1, titled "Robotic filling systems and methods," articulated arm apparatus 22 allows environment enclosure 20 to be cleanable to a much greater degree than a conveyor belt system. Articulated arm apparatus 22 lends itself to being fully automated and this allows a greater degree of automation of the entire container-filling process within controlled environment enclosure 20 than what is otherwise attainable under such decontaminated or sterilized conditions as pertain within controlled environment enclosure 20. The use of articulated arm apparatus 22 eliminates some of the difficulties described in the background to this specification. In particular, articulated arm apparatus 22 allows the relevant nest to be held in a single action until processing is completed and container 90 or closure 120 is not held, as all handling operations may be carried out by means of nests 70, 100 or tubs 80, 110.

As regards method, the sealed nested container- or closure package 94, 124 may be opened outside filling system 10. Cover 82, 112 may be highly permeable to the atmosphere and therefore the step of removing sealed tub 80, 110 from its packaging 88, 118 may expose not only the sealed tub 80, 110 but also its contents to ambient atmosphere.

With inner door 26 between transfer chamber 30 and controlled environment enclosure 20 closed, outer door 32 of transfer chamber 30 may be opened. Sealed tub 80, 110 containing the nest 70, 100 with containers or closures 90, 120 may then be transferred via outer door 32 of transfer chamber 30 onto shelves 34 of transfer chamber 30. Shelves 34 may be, without limitation, carousel shelves.

In a next step, sealed tub 80, 110 may be decontaminated inside transfer chamber 30. Suitable decontamination includes, but is not limited to, exposure to hydrogen peroxide gas or ozone. Other suitable means of decontamination may include, without limitation, electron beam irradiation and ultraviolet irradiation. Transfer chamber 30 may be any isolatable and decontaminatable vessel, including without limitation, an autoclave or a radiation based decontaminatable vessel that is configured to be placed in spatial communication with controlled environment enclosure 20. In the present specification, the term "transfer chamber" is used to describe any such vessel that is decontaminatable and which may be placed in spatial communication with controlled environment enclosure 20. Further examples of vessels suitable for use as transfer chamber 30 are provided below.

In some cases it may be advantageous to decontaminate transfer chamber 30 together with controlled environment enclosure 20. When decontaminated simultaneously, the seals on inner door 26 will be decontaminated. In some other cases the seal area of door 26 may be negligible.

Covers 82, 112 may be highly permeable to gases and decontamination agents. Certain materials may be susceptible to significant sorption of decontamination agents during decontamination of the transfer chamber. Exposure of pre-sterilized materials of tubs 80, 110 to decontamination agents may be prevented by use of an impermeable cover instead of cover 82, 112, or by addition of an impermeable layer on top of cover 82, 112. Suitable methods for adding such an impermeable layer includes, without limitation adhesive film and heat seals.

In another aspect of this invention, transfer chamber 30 may be a vacuum chamber; and is configured to sterilize the contents of tub 80, 110. Thermal and fast non-thermal sterilization cycles are well known in the art. The fast cycle time of non-thermal sterilization cycles may be particularly advantageous. Such cycles are typically used in hospital settings, for example for sterilization of surgical instruments. Gaseous sterilization agents may be hydrogen peroxide, ozone and combinations thereof.

Transfer chamber 30 may be equipped with a plasma generator for rapid activation and removal of sterilization agents. The addition of non-thermal sterilizing transfer chamber 30 to controlled environment enclosure 20 is particularly well suited for processing of nested pharmaceutical container materials.

When tub 80, 110 has been decontaminated, inner door 26 may be opened to place the interior of transfer chamber 30 in communication with the interior of controlled environment enclosure 20 and articulated arm apparatus 22 may be employed to remove sealed nested materials 88, 118 from transfer chamber 30 into controlled environment enclosure 20 through inner door 26. Since articulated arm apparatus 22 is a decontaminated or sterilized structure, and it is gripping tub 80, 110 in a decontaminated environment, the gripping of tub 80, 110 by articulated arm apparatus 22 is referred to in the present specification as "aseptically gripping." By way of contrast, other methods of transfer may not involve gripping or may not be aseptic, requiring controlled environment enclosure 20 to be sterilized or decontaminated after transfer.

Articulated arm apparatus 22 may be employed to remove one or both of lid 86, 116 and sheet 84, 114 within controlled environment enclosure 20. A suitable method for using articulated arm apparatus 22 to remove lid 86, 116 is described in Patent Cooperation Treaty Application WO 2013/166379, the disclosures of which are hereby incorporated in full. Sheet 84, 114 may alternatively be removed using suitable suction. Articulated arm apparatus 22 may then remove nests 70, 100 with containers or closures 90, 120 from the tubs 80, 110.

Closure monitoring subsystem 28 is mounted outside chamber 20 to view chamber 20 through window 35 and is employed to determine the presence or absence of closures in closure nests. It will be discussed in more detail later at the hand of FIG. 9.

Controlled environment enclosure 20 comprises filling station 60. In one embodiment, shown in FIG. 1, filling station 60 comprises fill needle system 62 supplied with liquid product via fluid path 64 from fluid reservoir 50 under the action of suitable pump 52. Pump 52 may be, without limitation, a peristaltic pump. The liquid product may be filtered via suitable filter 54. The fluid may enter into controlled environment enclosure 20 along fluid path 64 via suitable fluid path connector 56.

In one embodiment of the method, shown in FIG. 1, articulated arm apparatus 22 may move an opening of each container 90 one after the other under fill needle system 62. Fill needle system 62 may comprise a single fill needle, or may comprise a plurality of fill needles. If fill needle system 62 comprises a single fill needle, containers 90 are filled one after the other by moving container nest 70 and operating fill needle system 62 to fill containers 90. If fill needle system 62 comprises a plurality fill needles, containers 90 are filled one plurality after another by moving container nest 70 and operating the fill needle system to fill containers 90. The end of arm tool 24 may be rotated to align containers 90 with the fill needle(s) of fill needle system 62.

Figure 4:
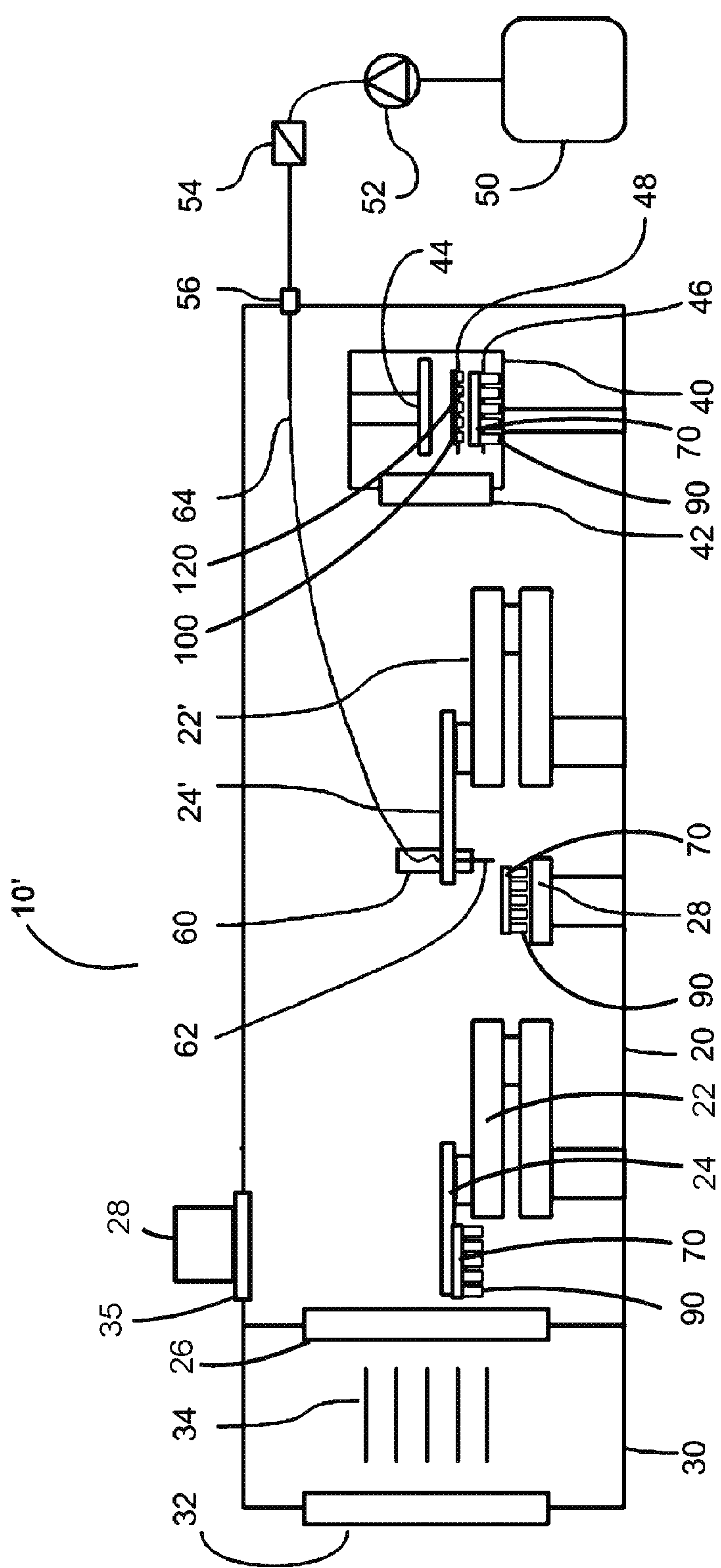
FIG. 4 shows an alternative embodiment of a system for filling pharmaceutical containers.

In another embodiment, shown in FIG. 4, container nest 70 with containers 90 is placed in a fixed position on pedestal 28 and fill needle system 62 is spatially manipulated by suitable second articulated arm apparatus 22' to place fill needle system 62 above the openings of containers 90. Containers 90 are thus filled by moving and operating the fill needle system. Second articulated arm apparatus may be of the same type as articulated arm apparatus 22. It may have an end of arm tool 24' configured for manipulating fill needle system 62. Having a second articulated arm apparatus dedicated to filling, frees up articulated arm apparatus 22 for handling of second tub 80, 110 and nest 70, 100 while first tub 80, 110 is being filled.

Filling system 10 comprises stoppering apparatus 40 that may have an interior that may be isolated from the interior of controlled environment enclosure 20. The interior of controlled environment enclosure 20 is in communication with an interior of stoppering apparatus 40 via stoppering system door 42. In the embodiment depicted in FIG. 1, stoppering apparatus 40 is shown as being contained within controlled environment enclosure 20. In other embodiments stoppering apparatus 40 may be arranged in a separate chamber from controlled environment enclosure 20 and may communicate with controlled environment enclosure 20 via a suitable stoppering system door.

Container nest shelf 46 and closure nest shelf 48 are disposed within the interior of stoppering apparatus 40. Container nest shelf 46 and closure nest shelf 48 are disposed to allow closures 120 in closure nest 100 to be centered on the openings of containers 90 in container nest 70 when closure nest 100 and container nest 70 are placed on respectively container nest shelf 46 and closure nest shelf 48.

As with the embodiment in FIG. 1, closure monitoring subsystem 28 is mounted outside chamber 20 to view chamber 20 through window 35 and is employed to determine the presence or absence of closures in closure nests. It will be discussed in more detail later at the hand of FIG. 9.

In one embodiment of the method, shown in FIG. 1, stoppering system door 42 is opened and articulated arm apparatus 22 moves container nest 70 with filled containers 90 to place it on container nest shelf 46. Articulated arm apparatus 22 may be used to move closure nest 100 with closures 120 to place it on closure nest shelf 48. Each filled container 90 thereby has a closure concentrically positioned directly above it. Closure nest 100 with closures 120 may be placed on closure nest shelf 48 either before or after container nest 70 with filled containers 90 is placed on container nest shelf 46. To this end the container nest 70 and closure nest 100 may have mutually matching geometries to arrange one of closure 120 concentrically with the opening of one of container 90.

After container nest 70 with containers 90 and closure nest 100 with closures 120 have been located on their respective shelves 46 and 48 within stoppering apparatus 40, stoppering system door 42 is closed. To the extent that some stoppering procedures need to be performed under vacuum conditions or under inert atmosphere, the required vacuum or inert atmosphere may then be established within the interior of stoppering apparatus 40.

Stoppering apparatus 40 is configured close all containers simultaneously using actuated ram 44. For some subsequent operations, such as freeze-drying, the stoppers are required to be only partially inserted and actuated ram 44 may be configured to only partially insert stoppers 140. After insertion of stoppers 140, articulated arm apparatus 22 removes nest 70 with containers 90 from stoppering apparatus 40.

In another embodiment, articulated arm apparatus 22 loads nested containers 90 and nested caps 130 with integrated stoppers 140 into stoppering apparatus 40. As described above, apparatus 40 may simultaneously stopper and cap nest 70 of containers 90.

After completion of the stoppering and capping, articulated arm apparatus 22 moves nested containers 90 back into transfer chamber 30. In other embodiments, articulated arm apparatus 22 may move the filled, stoppered, and capped nest 70 with containers 90 to an adjacent controlled environment enclosure (not shown) through a suitable communicating door (not shown). Capped nest 70 with containers 90 may be moved to the adjacent controlled environment enclosure with the containers only partially stoppered or partially closed.

Figure 5A:
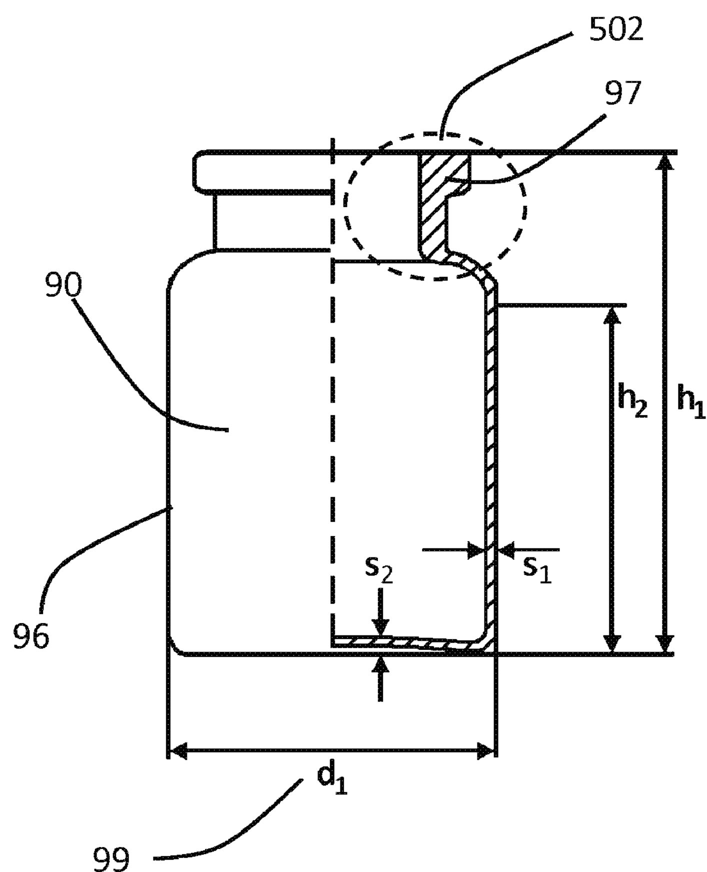
FIGS. 5A and 5B show a pharmaceutical container and its key dimensions.
Figure 5B:
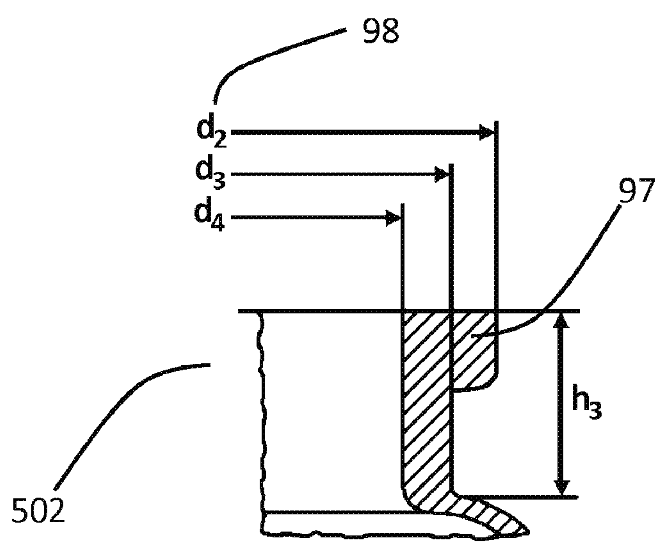

FIG. 5A shows the generic shape of pharmaceutical container 90, which in this example is a vial. The container comprises cylindrical container body 96 and neck 97. Neck 97 of container 90 is shown in enlarged view in FIG. 5B in which area 502 of FIG. 5A is presented in more detail. The diameters $d_1$, $d_2$, $d_3$ and $d_4$ of different portions of container 90 are provided in FIG. 5A and FIG. 5B, as are the heights $h_1$, $h_2$ and $h_3$ of different portions of container 90. Symbols $s_1$ and $s_3$ give the wall thickness and base thickness of cylindrical container body 96 respectively. Typically, $d_2$ neck diameter 98 of container 90 is only slightly smaller than $d_1$ main diameter 99 of container 90. This allows the placement of cap 130 on the vial without reducing the packing density of containers 90 in nest 70 of FIG. 2. Therefore, the densest circle packing density of the caps is closely the same as the packaging of the containers. It is particularly advantageous for the cap nest to have exactly same packaging geometry as the vial nest, so that the cap nest may be overlayed on the vial nest and caps be applied without movement of the nest. Caps may be applied one at a time, multiples in a row, or all at once.

Figure 6A:
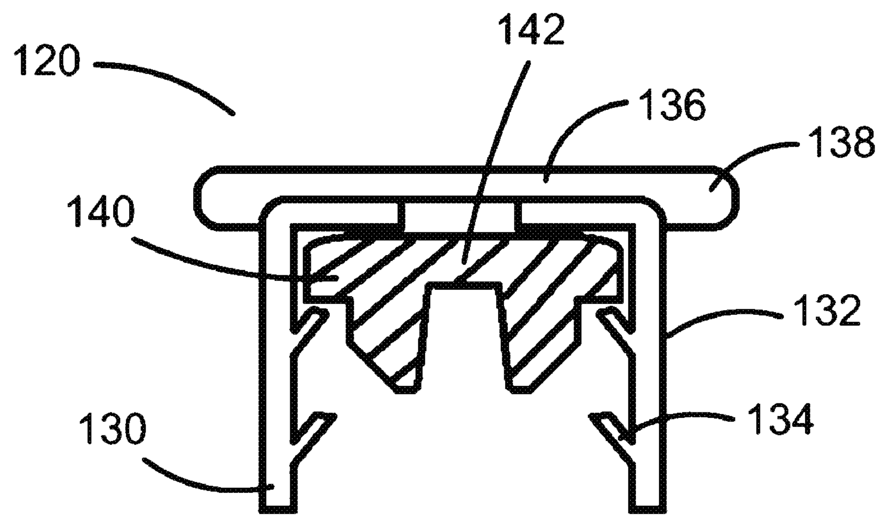
FIG. 6A and FIG. 6B show two embodiments of closures for pharmaceutical containers.

In another aspect, this specification provides a nest for holding closures. We consider first generic closure 120 provided in FIG. 6A. Closure 120 comprises cap 130 and stopper 140. Stopper 140 has thinner septum 142 that is pierceable by an extraction needle such as that of a syringe. Cap 130 comprises cylindrical cap body 132, at least a first set of barbed retention features 134, and tamper-evident flip-off cover 136. In the example of FIG. 6A two sets of barbed retention features 134 are shown and these may be arranged in a pattern around the inner perimeter of cap 130. Tamper-evident flip-off cover 136 is manufactured as an integral part of cap 130 such that, when cover 136 is removed, it cannot be replaced. This serves as verification that septum 142 of stopper 140 has been exposed. Cover 136, in this particular example, has a larger diameter than body 132 of cap 130. This may serve as holding feature 138 for cap 130 and thereby for closure 120, which may be exploited for holding closure 120 in closure nest 100.

Figure 6B:
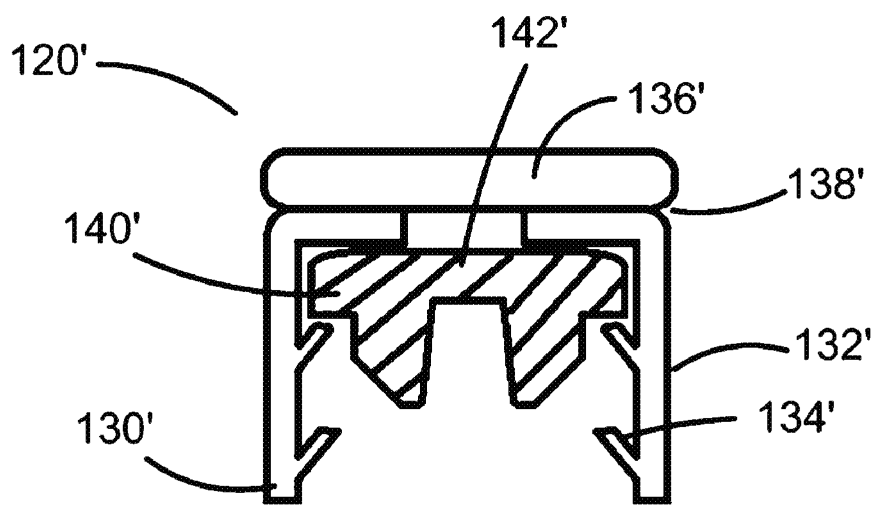

In FIG. 6B, another example closure 120' comprises cap 130' and stopper 140'. Stopper 140' has thinner septum 142' that is pierceable by an extraction needle such as that of a syringe. Cap 130' comprises cylindrical cap body 132', at least a first set of barbed retention features 134', and tamper-evident flip-off cover 136'. In the example of FIG. 6A, two sets of barbed retention features 134' are shown and these may be arranged in a pattern around the inner perimeter of cap 130'. Tamper-evident flip-off cover 136' is manufactured as an integral part of cap 130' such that, when cover 136' is removed, it cannot be replaced. This serves as verification that septum 142' of stopper 140' has been exposed. Cover 136', in this particular example, has the same diameter as body 132' of cap 130'. However, dimple 138' is provided at the join between cover 136' and cap body 132'. This may serve as holding feature 138' for cap 130' and thereby for closure 120', which may be exploited for holding closure 120' in closure nest 100.

In the prior art these vial caps have been made from aluminum with polymeric flip-off covers. Capping of aluminum caps typically generates considerable amounts of non-viable particles and this has tended to make aluminum caps unacceptable in recent times. Caps made of polymeric material are now commercially available. The polymeric caps are particularly well suited for use with polymeric containers, but may also be used for glass containers.

The most optimal geometry of containers 90 in nest 70 follows the mathematical theories of equal sized circle packing, leading typically to hexagonal, triangular, square, elongated triangular, snub square and other related geometrical patterns of container positions in nest 70.

In this specification, closure nest 100 is presented in which the geometrical arrangement of closures 120, 120' closely matches the geometrical patterns of container positions in nest 70. In some embodiments, closure nest 100 has exactly same packaging geometry as container nest 70, with the distribution of closure centers in closure nest 100 lining up within a working tolerance with the distribution of container centers in container nest 70. This allows closure nest 100 to be overlayed on container nest 70, and closures 120, 120' to be applied to containers 90 so that all closures 120, 120' in closure nest 100 may be applied to all containers 90 in container nest 70 without any substantial movement of either nest 70 or closure nest 100. Closures 120, 120' may be applied one at a time, one row at a time, or all at substantially the same time.

Figure 7A:
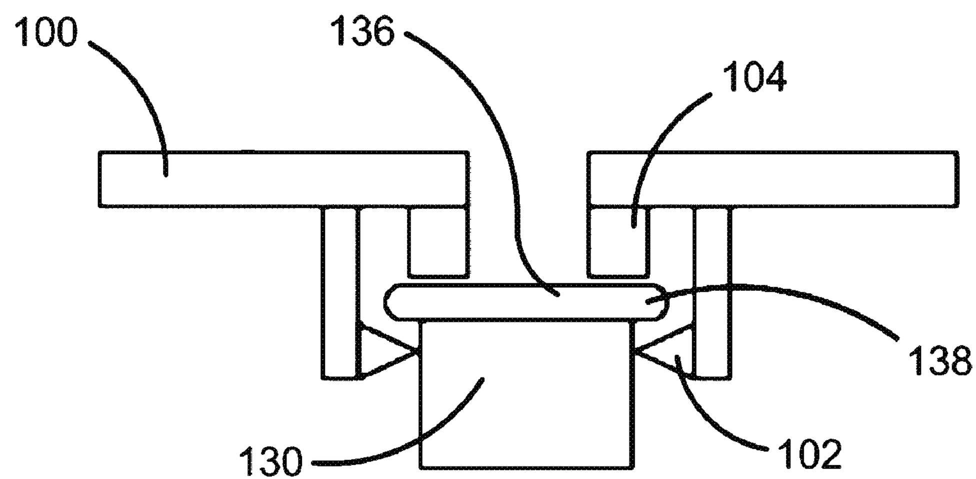
FIG. 7A and FIG. 7B show two embodiments of closure retaining structures for closure nests.

In FIG. 7A, a part of closure nest 100 is shown schematically, depicting a closure retaining structure for single cap 130 of closure 120 of FIG. 6A. In FIG. 7A, associated stopper 140 is contained within cap 130 and is therefore not visible. It is to be understood that the part of closure nest 100 shown in FIG. 7A is descriptive of a plurality of such parts, and that the parts are arranged two dimensionally to concentrically align a plurality of containers 90 in container nest 70 center-to-center with a plurality of closures 120 held by closure nest 100. The closure retaining structure comprises spring-loaded retaining structure 102, arranged to engage with holding feature 138 on cover 136 of cap 130, thereby holding cap 130 vertically suspended. The closure retaining structure further comprises stop structure 104 against which cap 130 may push when cap 130 and closure nest 100 are pushed together vertically. Cap 130' of FIG. 6B may similarly be held by its specific holding feature 138'.

Figure 7B:
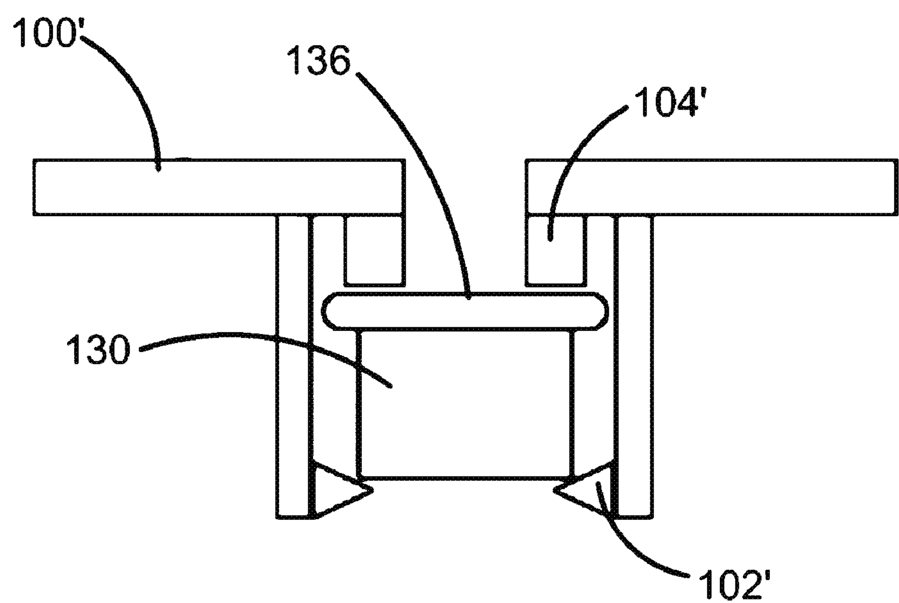

In FIG. 7B, a part of another closure nest 100' is shown schematically, depicting a closure retaining structure for single cap 130 of closure 120 of FIG. 6A. In FIG. 7B, associated stopper 140 is contained within cap 130 and is therefore not visible. It is to be understood that the part of closure nest 100' shown in FIG. 7B is descriptive of a plurality of such parts, and that the parts are arranged two dimensionally to concentrically align a plurality of containers 90 in container nest 70 center-to-center with a plurality of closures 120 held by closure nest 100'. The closure retaining structure comprises spring-loaded retaining structure 102', arranged to engage with the bottom of cap 130, thereby holding cap 130 vertically suspended. In this arrangement, the bottom of cap 130 therefore serves as generic holding feature. The closure retaining structure further comprises stop structure 104' against which cap 130 may push when cap 130 and closure nest 100' are pushed together vertically.

The spring-loaded retaining structure may be implemented in different ways. One non-limiting example spring-loaded retaining structure 102 is an elastically flexible retaining structure. Spring-loaded retaining structure 102 may be a separate structure from closure nest 100 that is fastened to closure nest 100. In other embodiments, spring-loaded retaining structure 102 is an integral part of closure nest 100 and may be manufactured to be monolithically integrated with closure nest 100. One non-limiting way of manufacturing spring-loaded retaining structure 102 as a monolithically integrated part of closure nest 100, is by injection molding of a suitable polymer.

Spring-loaded retaining structure 102 holds cap 130, 130' in place during handling and transport, and may flex open without risk of removing tamper evident cover 136, 136' when cap 130, 130' is being pushed or pulled out of closure nest 100, 100'. The direction of capping force may be upwards, downwards or both. Sections of closure nest 100, 100' may be reinforced by structural features such as honeycombs to distribute the capping force and to prevent bowing during handling.

The integrity of container 90 and closure 120, 120' is achieved by deforming elastomeric stopper 140, 140' by compressing elastomeric stopper 140, 140' against container 90 and permanently holding it in this compressed state by cap 130, 130'. The radial compression of stopper 140, 140' by the interference fit inside of the neck of container 90, as indicated with diameter $d_4$ in FIG. 5 may well create a seal, but that seal is generally considered no more than a secondary seal. In fact some stopper designs for cap 130, 130' may go without any plug shape surrounding septum 142, 142'.

It is the vertical compression of the flange part of stopper 140, 140' against the top of the container 90, on the area of container 90 indicated with diameters $d_4$ and $d_2$ in FIG. 5, that creates the primary seal. Typically a high residual sealing force is required to guarantee a robust container seal and provides a wide safety margin for changes in stopper 130,130', such as compression set. The compression force required for final sealing has to be conveyed through the top surface of cap 130,130'. Therefore an annular shape may be one non-limiting employed for stop structure 104,104' to apply the compression force to the area of cap 130,130' directly above the primary seal. Moreover, an annular shape for stop structure 104,104' allows for removal of the capped vial from nest by insertion of a push rod through the opening.

Different shapes may be employed for stop structures 104, 104', depending on the particular design of the cap. Stop structures 104, 104' also determine the length of spring-loaded retaining structure 102, 102' and therefore its spring retention and opening force. Spring-loaded retaining structure 102, 102' may be substantially linear and orthogonal to closure nest 100, 100'. In yet other examples the height of stop structures 104, 104' and spring-loaded retaining structure 102, 102' may be reduced by curling radially. In those cases where steam sterilization is required of caps 130, 130' in the closure nest 100, 100', the contact area between stop structure 104, 104' and cap 130, 130' may be reduced to a series of point contacts to allow for good accessibility of steam.

Spring-loaded retaining structure 102, 102' may be sized and shaped such that, when cap 130, 130' is secured on container 90, spring-loaded retaining structure 102, 102' is automatically pushed out of the way by container 90, thereby releasing cap 130, 130'. The close packing of closure retaining structures on closure nest 100, 100' implies that there is limited space for lateral motion of spring-loaded retaining structures 102, 102'. For example, in a hexagonal close packed arrangement, each closure retaining structure is surrounded by six nearest neighbor closure retaining structures, each requiring space for its spring-loaded retaining structures 102, 102' to open in order to release corresponding cap 130. Each spring-loaded retaining structure 102, 102' is sized and positioned to allow caps 130, 130' on neighboring closure retaining structures to be applied simultaneously to containers 90 correspondingly arranged in container nests 70.

In one embodiment, caps 130, 130' are each held by at least three spring-loaded retaining structures 102, 102' in order to geometrically restrain the cap in its position. In general, each closure retaining structure on closure nest 100, 100' implies a plurality of spring-loaded retaining structures 102, 102'. In concept, there may be one single annular spring-loaded retaining structure 102, 102' for each single closure retaining structure, arranged to grip around the entire perimeter of cap 130, 130'. The most general embodiment of closure nest 100, 100' therefore has at least one spring-loaded retaining structure 102, 102' for each closure retaining structure.

In operation, a plurality of closures 120, 120' is releasably retained in closure nest 100, 100' through being held by spring-loaded retaining structures 102, 102' being engaged with holding features 138 of closures 120, 120', the closure bottoms being a special kind of holding feature. To engage closures 120, 120' in this fashion, closures 102, 102' are pushed into the closure retaining structures, during which action the spring-loaded retaining structures 102, 102' are elastically displaced by caps 130, 130' of closures 120, 120' until spring-loaded retaining structures 102, 102' click into position on holding features 138, 138'. The closures are then supplied to the filling process in this configuration.

Figure 8:
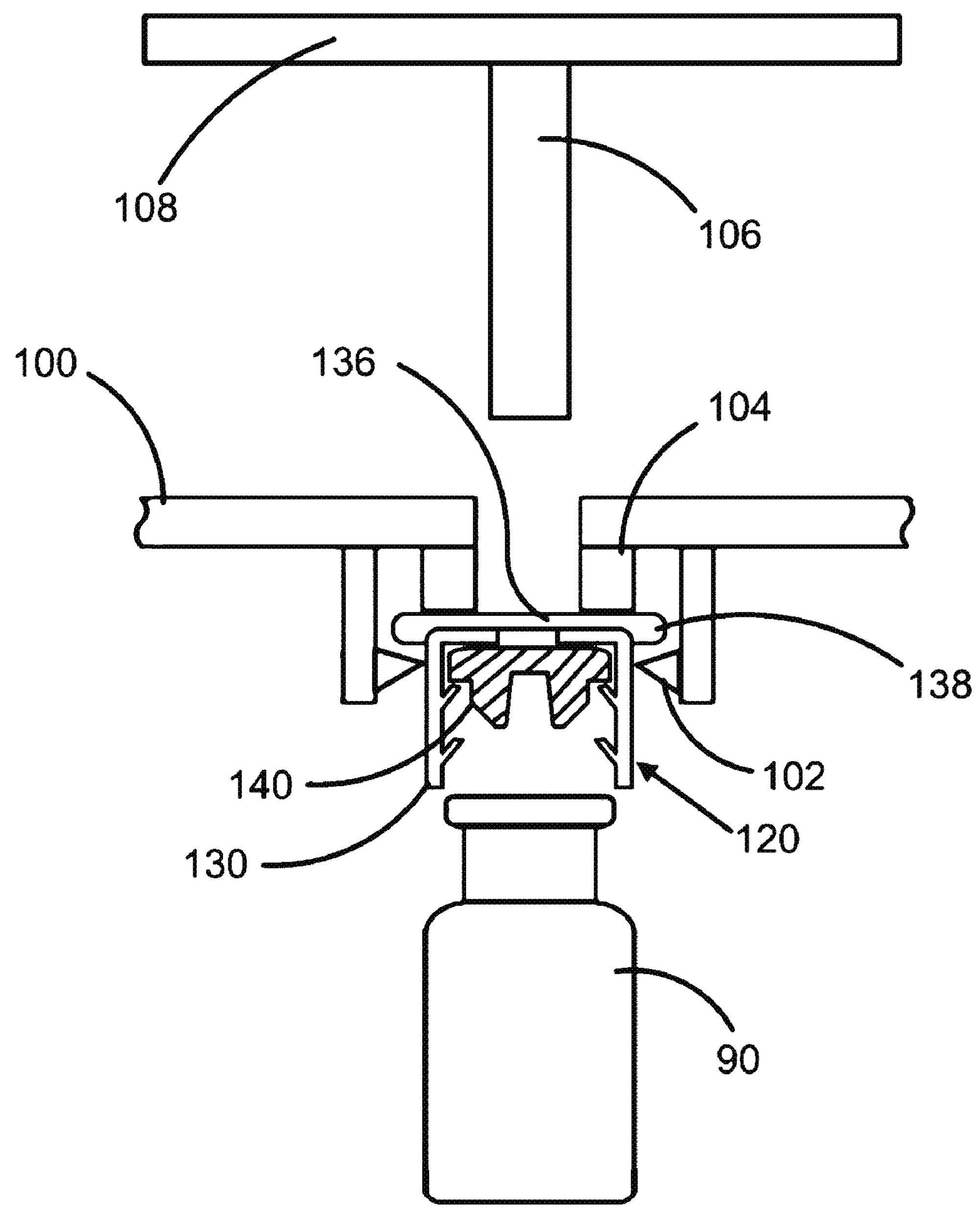
FIG. 8 shows an arrangement for closing the container of FIG. 5 with the closure of FIG. 6A using the closure retaining structures of FIG. 7A.

FIG. 8 shows the configuration for the closing of one single container 90, being one of a plurality of containers held in container nest 70 of FIGS. 1, 2 and 4. For closing, closure 120, being one of a corresponding plurality of closures 120 releasably retained by closure nest 100, is concentrically aligned with container 90 by virtue of the geometries of nests 70 and 100 corresponding center-to-center with each other in two dimensions. The closure holding structure is that of FIG. 7A and the closure detail is that of FIG. 6A, with a limited number of elements of closure 120 labeled for clarity. When elements are not numbered, the numbers of FIG. 6A pertain.

During the closing of container 90 with closure 120, container 90 and closure 120 are vertically forced together. This may be done to a degree that merely causes the top of container 90 to engage with barbed retention features 134 (See FIG. 6A). This constitutes partial closing. The application of further force pushes stopper 140 via stop structures 104 deeper into container 90 to seal it. In a final step, container 90, duly capped and closed with closure 120, may be disengaged from the closure holding structure of closure nest 100 by pushing downward on cover 136 of cap 130 of closure 120 with rod 106 attached to platen 108. Platen 106 may extend over the whole surface of closure nest 100 or may extend over part of it. There may be the same number of rods as the number of closures held by closure nest 100, or rods 106 may be fewer. This action forces open spring-loaded retaining structures 102, 102' and releases capped container 90 from the closure holding structure of closure nest 100. This process or method may be conducted simultaneously for a plurality of closure holding structures of closure nest 100. All the closures in all the closure holding structures of closure nest 100 may undergo this procedure simultaneously.

In a most general description, this specification provides closure nest 100, 100' for releasably retaining a plurality of closures 120, 120' for pharmaceutical containers, closure nest 100, 100' comprising a plurality of closure retaining structures each comprising at least one spring-loaded retaining structure 102, 102' and stop structure 102, 102', spring-loaded retaining structure 102, 102' configured to engage with holding feature 138 on one of the plurality of closures 120, 120' and stop structure 104, 104' configured to exert force on and confine the one of the plurality of closures 120, 120'. The closure retaining structures may be arranged in a geometric pattern, which geometric pattern may be a close packed pattern and which may match center-to-center a corresponding a pattern of container-holding structures on a container nest. Spring-loaded retaining structure 102, 102' may be a flexible structure and may be manufactured from a polymer. Spring-loaded retaining structure 102, 102' may be monolithically integrated with closure nest 100, 100'.

Associated with closure nest 100, 100', a method for holding a plurality of closures 120, 120' comprises releasably retaining each closure 120, 120' by releasably suspending each closure 102, 102' by holding feature 138 on closure 120, 120', the holding feature being a specifically designed holding feature 138 or the bottom of a closure as in FIG. 7B. The releasably suspending may be spring-loaded retaining, which is achieved by flexibly deforming or spring-wise deforming spring-loaded retaining structure 102, 102' or an equivalent structure. The term "spring-loaded" is used in this specification to describe any form of spring loading, whether by mechanical spring or by a flexible member, or by any other arrangement that produces a suitable spring or elastic action.

The method provided here for aseptically sealing a pharmaceutical product into a plurality of containers comprises: introducing a first plurality of containers into a controlled environment enclosure; releasably suspending from a closure nest in the controlled environment a plurality of aseptic closures; filling at least a first portion of the first plurality of containers with the pharmaceutical product; and simultaneously sealing at least partially a second portion of the first plurality of containers with a portion of the plurality of aseptic closures while releasably retaining the aseptic closures in the closure nest. The method may further comprise lyophilizing the pharmaceutical product in the second portion of the first plurality of containers while releasably retaining the aseptic closures in the closure nest.

The releasably suspending and releasably retaining may comprise releasably engaging with a holding feature of each of the plurality of aseptic closures. The releasably engaging with the holding feature may comprise elastically engaging with the holding feature. The elastically engaging with the holding feature may comprise engaging the holding feature with a spring-loaded retaining structure portion of the closure nest.

Some or all of the plurality of the aseptic closures retained by the closure nest may be used to either fully or partially seal the pharmaceutical product into the containers. The plurality of containers may be equal in number to the number of aseptic closures releasably suspended by the closure nest. Two or more containers may be filled simultaneously.

Amongst its beneficial results, closure nest 100, 100', with spring-loaded retaining structures 102, 102' and stop structures 102, 102' described in this specification, lends itself to the simultaneous capping and stoppering, both partially and completely, of pluralities of containers 90. More specifically, it lends itself to the simultaneous capping, both partially and completely, of rows of containers 90. Yet more specifically, it lends itself to the simultaneous capping, both partially and completely, of complete two-dimensional arrays of containers 90 in container nests 70. There is no direct contact between closure nest 100, 100' and any parts that will contact the pharmaceutical product. All handling of closures 120, 120' by articulated arm apparatus 22 is accomplished using closure nest 100, 100'. All contact with closure nest 100, 100' within the aseptic environment of controlled environment enclosure 20 is accomplished using devices and surfaces that may be sterilized.

Given the arrangement of closures 120 in closure nests 100, together with the rising cost of some pharmaceuticals, it becomes important for automated filling systems 10, 10' to be able to confirm that a given closure nest 100 does indeed have its full design complement of closures. It is entirely possible that one closure may become disengaged from spring-loaded retaining structure 102, 102' and fall out of closure nest 100. If automated filling were to proceed, and a container 90 in a nest 70 filled without a corresponding closure 120 being available, it could result in the loss of a very expensive batch of pharmaceuticals and the contamination of system 10, 10'. In order to address this problem, closure nest monitoring subsystem 28 may be added to filling system 10, 10', as shown in FIG. 9, using system 10 in particular in this example.

As already explained at the hand of FIG. 1, FIG. 2, FIG. 3, and FIG. 4, articulated arm apparatus 22 of FIG. 1 comprises an end of arm tool 24 configured to hold tubs and nests. Articulated arm apparatus 22 may be, without limitation, a robotic articulated arm. In FIG. 9, end of arm tool 24 of system 10 is shown holding closure nest 100 with closures 120. With reference to FIG. 7A, FIG. 7B, and FIG. 8, it should be noted that closure nests 100, 100' have an opening above every closure position that allows the presence or absence of closure 120, 120' to be detected from a position above closure nest 100, 100'.

In other embodiments, closure nest 100 may, for example, be held by a vacuum pickup system. Examples of suitable vacuum pickup systems are provided by US Patent Publication 2018/0072446A1 Published 15 Mar. 2018, and U.S. patent application Ser. No. 15/465,516 filed 21 Mar. 2017, the disclosures of both of which documents are hereby incorporated herein in full.

Figure 9:
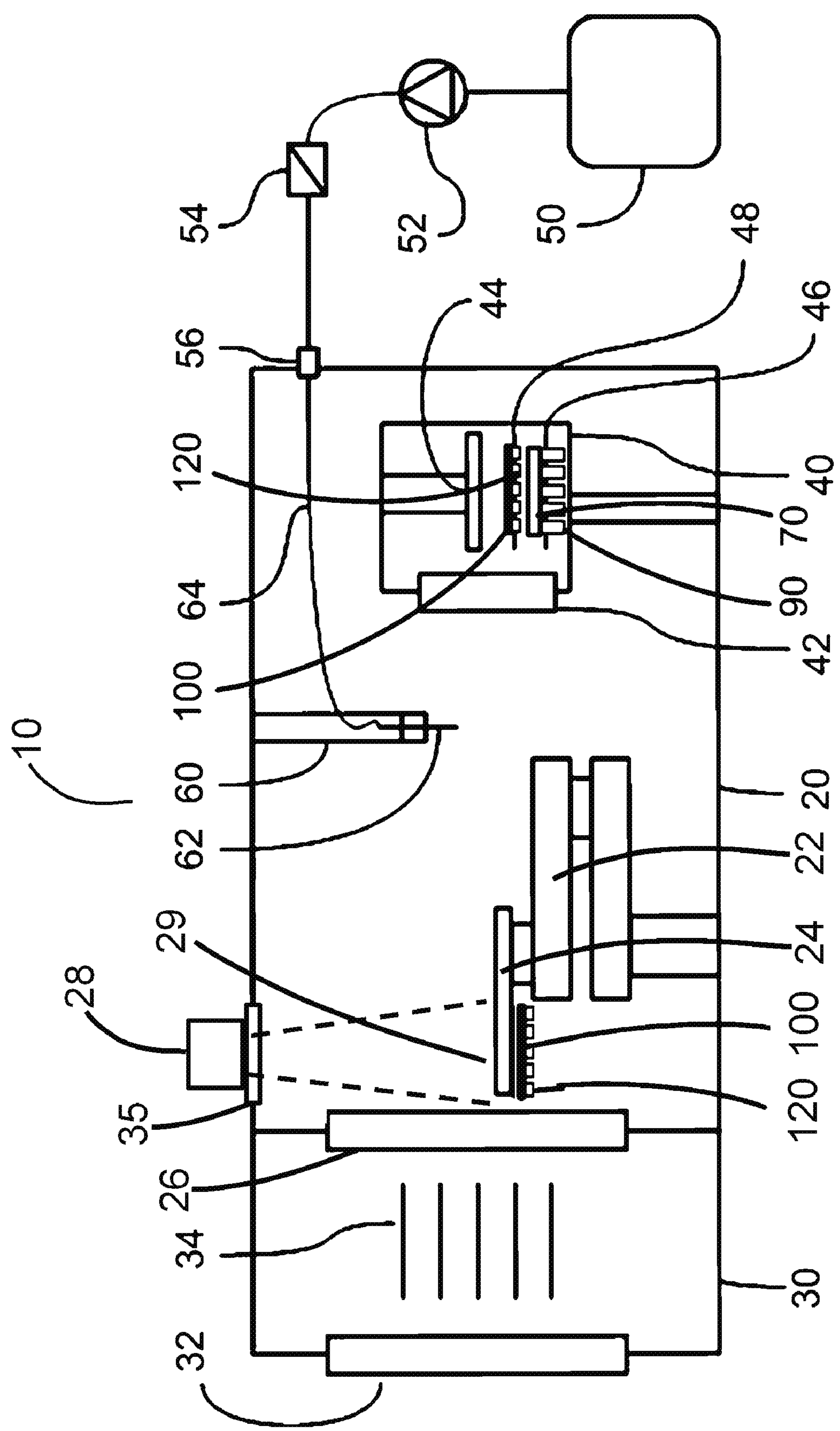
FIG. 9 shows the filling system of FIG. 1 in a topographical profiling step.

Closure monitoring subsystem 28 of system 10 in FIG. 9 is mounted outside chamber 20 in order to minimize potential contamination and dust inside chamber 20. It has a view into chamber 20 via window 35 and is capable of monitoring monitored area 29 on the surface of closure nest 100. In some embodiments, monitored area 29 is defined by a field of view of the monitoring system as indicated in FIG. 9 by the broken lines.

Figure 10:
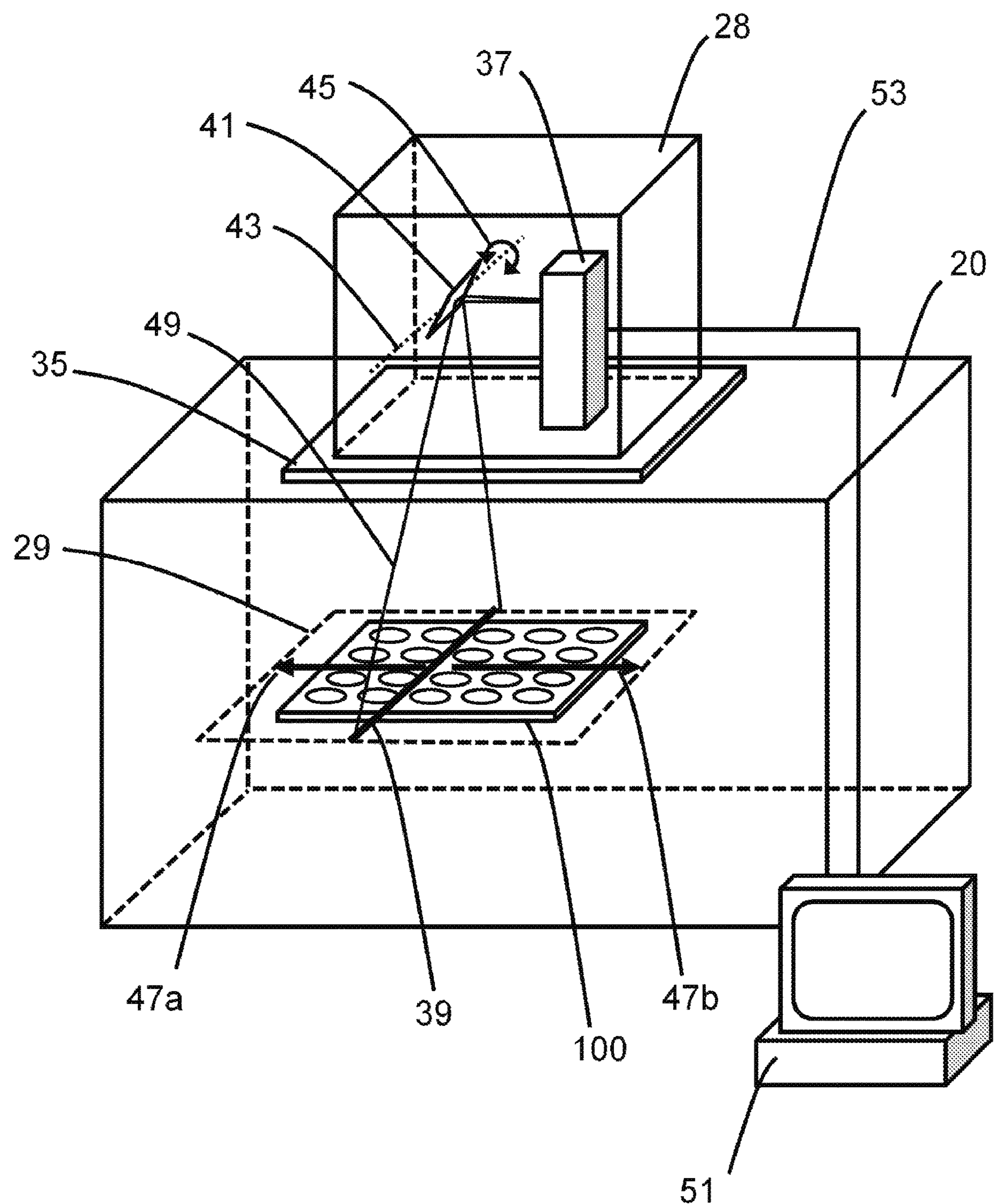
FIG. 10 shows the topographical imaging subsystem of FIG. 9 in more detail.

FIG. 10 shows a portion of system 10 and chamber 20. For the sake of clarity, some systems and items within chamber 20 are omitted. These include inner door 26, articulated arm apparatus 22, end of arm tool 24, and closures 120. Closure monitoring subsystem 28 may be in communication via data line 53 with controller 51 configured for controlling closure monitoring subsystem 28. Controller 51 may have software for controlling closure monitoring subsystem 28, for receiving profile maps from closure monitoring subsystem 28, and for analyzing profile maps obtained by closure monitoring subsystem 28.

Closure monitoring subsystem 28 comprises a topographical profiler. The topographical profiler may be any device capable of providing a profile map of vertical displacement versus the two mutually perpendicular directions contained within the surface of closure nest 100. Suitable topographical profilers include without limitation triangulation laser scanners and stereo camera systems. Suitable individual products that may be employed as the topographical profiler of closure monitoring subsystem 28 include the In-Sight® Laser Profiler from Cognex Corporation (In-Sight® is a Registered Trademark Cognex Corporation of Natick, Mass.), and some of the Gocator® line of laser profilers from LMI Technologies (Gocator® is a Registered Trademark of LMI Technologies Inc. of Burnaby, BC Canada).

Some topographical profilers are equipped with a fixed source/sensor unit and a scanning mirror. In some cases the laser light is provided in the form of a line and the line is swept by the mirror that serves to direct the laser line. Other devices employ a laser spot that is directed to address some or other solid angle in space. Stereoscopic systems may use ambient light or their own generated light.

In FIG. 10, laser scan line source 37 and tilting mirror 41 together constitute a suitable topographical profiler. Tilting mirror 41 rotationally reciprocates about rotation axis 43, as indicated by rotary arrow 45. Rotation axis 43 is parallel to the surface of closure nest 100. In the process, laser beam 49 is scanned back and forth in the form of laser line 39 over monitored area 29, as indicated by arrows 47*a* and 47*b*.

Closure monitoring subsystem 28 may obtain by scanning, using laser line 39, a topographical profile of closure nest 100 within monitored area 29 while both the topographical profiler and closure nest 100 remain stationary. In other embodiments one of the topographical profiler and closure nest 100 may be translated to obtain the profile of closure nest 100 when the nest is located within monitored area 29. In yet further embodiments, both closure nest 100 and the topographical profiler may be moved. A planar mirror rotating about an axis in its own reflective plane may be used in some topographic profilers to scan the laser beam, the implementation in FIG. 10 being an example. In other suitable embodiments of topographical profilers, the camera of the system is tilted instead of using a tilting mirror.

Topographical profilers are well known in the art and their technical details will not be further expanded on here, beyond the two facts that they allow closure monitoring subsystem 28 to generate a topographical map of vertical displacement versus the two mutually perpendicular directions contained within the surface of closure nest 100 over monitored area 29.

Controller 51 may have a suitable memory and processor. The software for communication with and controlling of closure monitoring subsystem 28 may be loaded into the memory of controller 51 and the instructions of the software executed by the processor of controller 51. The software instructions, when loaded into the memory and executed by the processor of controller, instruct closure monitoring subsystem 28 to scan monitored area 29 and to return to controller 51 over data line 53 or a wireless connection (not shown) a topographical map of vertical displacement versus the two mutually perpendicular directions contained within the surface of closure nest 100 over monitored area 29.

The vertical displacement data may be anticipated to show, as per FIG. 7A and FIG. 8, the presence of closure 120 with cap 130 and tamper-evident flip-off cover 136 located a predetermined distance below the surface of closure nest 100. In other suitable closures there may be no tamper-evident flip-off cover. In yet other closures there is only a stopper. The predetermined distance therefore varies among closure nest designs and closure designs. In some cases tamper-evident flip-off cover 136 is being profiled, while in other cases it may be the top surface of a stopper within a cap, while in yet a further case it may be only a stopper being profiled. However, the predetermined distance is known for all combinations of closure nests 100 and closures 120 and closure designs, and may be incorporated in the software loaded into the memory of controller 51.

Determination of the presence or absence of closure 120 in closure nest 100 by controller 51 is made more complex by, among other factors, various spurious light reflections within the system. The software instructions therefore instruct controller 51 to search for reliable displacement signal within a predetermined range of vertical displacement values. If the vertical displacement signal at the closure location in closure nest 100 is not reliably between the upper and lower bounds of the predetermined range, then the closure at that location is deemed absent. If the vertical displacement signal at the closure location in closure nest 100 is reliably between the upper and lower bounds of the predetermined range, then the closure at that location is deemed present. The term "reliably" is used here to cover all data management techniques that may be employed to quantify the displacement reading corresponding to the location of closure 120 in closure nest 100. This may or may not include taking averages of the readings, doing curve fits through the readings, and simply discarding values that differ too much from a majority of readings across that location, and any other such data quality management techniques.

Figure 11:
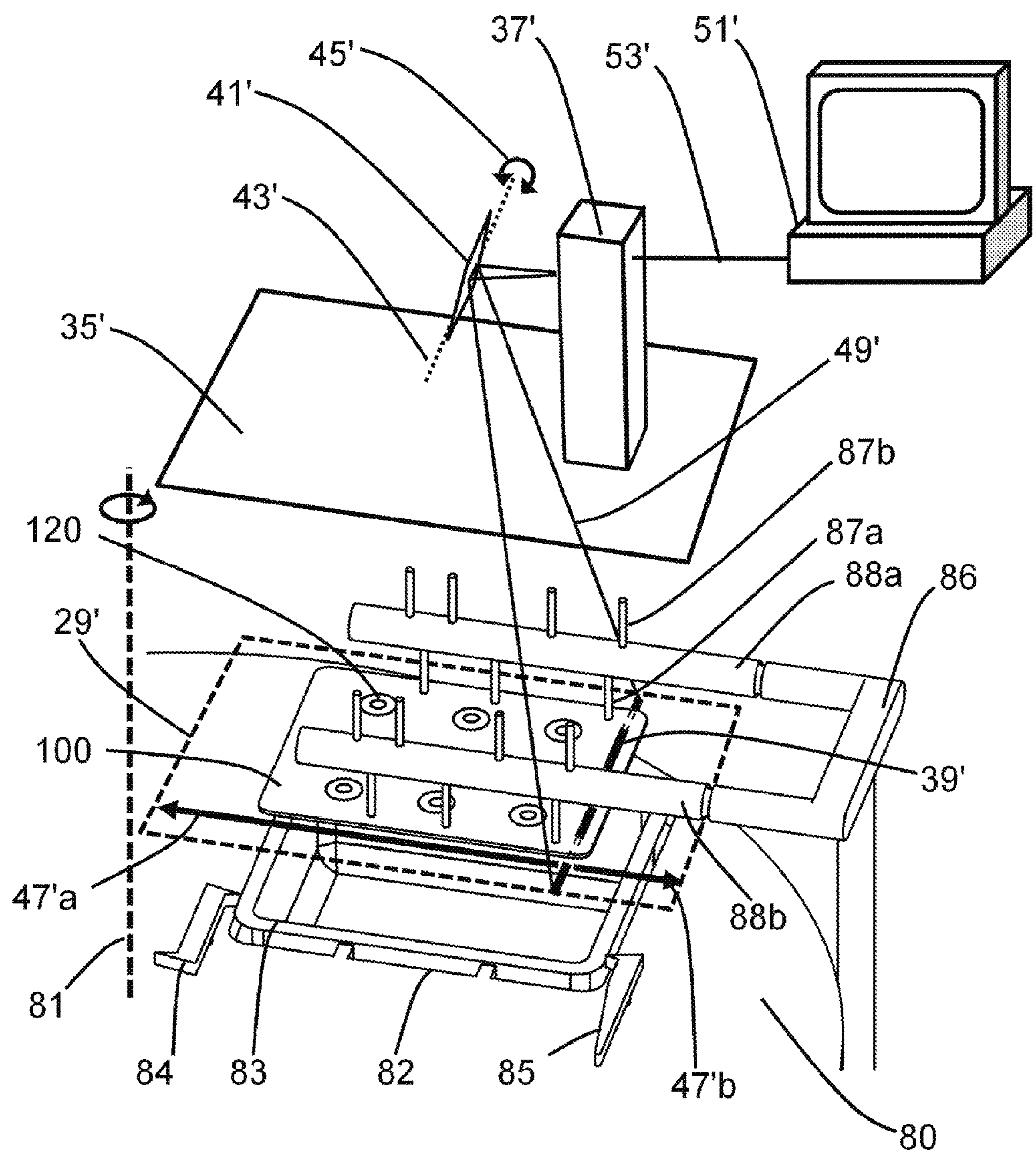
FIG. 11 shows another embodiment of a system employing a topographical profiling arrangement.

Another implementation that may employ the same measurement and data management techniques is shown in FIG. 11. In this case the closure monitor subsystem of FIG. 9 is fitted to a filling system of the type described in US Patent Publication 2018/0071168A1 Published 15 Mar. 2017, the disclosure of which is hereby incorporated in full herein. Only the parts of the filling system of US Patent Publication 2018/0071168A1 that are relevant to scanning closure nest 100 for closures 120 are shown in FIG. 11. In particular, neither the aseptic chamber housing the system nor the housing of the relevant closure monitoring subsystem is shown.

In FIG. 11, laser scan line source 37' and tilting mirror 41' together constitute a suitable topographical profiler. Tilting mirror 41' rotationally reciprocates about rotation axis 43', as indicated by rotary arrow 45'. Rotation axis 43' is parallel to the surface of closure nest 100. In the process, laser beam 49' is scanned back and forth through window 35' in the form of laser line 39' over monitored area 29', as indicated by arrows 47'*a* and 47'*b*. Controller 51' controls laser line scan source 37' and tilting mirror 41' via data line 51'. The topographical profiler returns to controller 51' a topographical map of vertical displacement versus the two mutually perpendicular directions contained within the surface of closure nest 100 over monitored area 29'.

In this particular implementation, closure nest 100 holding closures 120 is in its turn held by a plurality of vacuum suction cups 87*a* of vacuum pickup system 86. Vacuum pickup system 86 is mounted proximate rotary stage 80, rotatable about axis 81, with source fiducial opening 82 disposed for holding container closure tubs 83 containing closure nests 100. In FIG. 11 a single closure nest is shown, but closure tub 83 may hold a plurality of closure nests 100 containing closures 120. Only approximately a quadrant of rotary stage 81 is shown in FIG. 11. Vacuum pickup system 86 lifts closure nests 100 from container closure tub 83 by vacuum suction cups 87*a*. Rotary arms 88*a* and 88*b* are arranged and disposed to place either the plurality of vacuum suction cups 87*a* or the plurality of vacuum suction cups 87*b* in contact with closure nest 100. The choice of which vacuum suctions cups to employ is based on the design of the particular closure nest 100 in use. Restraining member 85 and stopping member 84 serve to hold tub 83 firmly in position. Despite the different implementations of the hardware of FIG. 10 and FIG. 11, the way in which the topographical map is obtained and its subsequent analysis to determine the presence or absence of closures in and from closure nest 100 is essentially the same.

In further implementations, closure nest 100 holding closures 120 may be placed on a fixed station to be scanned for the presence or absence of closures. In all implementations, closure nest 100 is disposed within monitored area 29', whether by articulated arm 22 (as in FIG. 9), vacuum pickup system 86 (as in FIG. 11), or by any other suitable mechanisms.

The above embodiments describe an apparatus for confirming the presence or absence of closures in a closure nest inside an aseptic chamber, the apparatus comprising: a topographical profiler disposed to monitor a monitored area inside the aseptic chamber; a nest handler disposed inside the chamber for moving the closure nest into the monitored area, the nest having a surface; a database of predetermined ranges of vertical displacements having lower and upper bounds in areas of the closure nest where closures are expected to be present, the data covering different combinations of nests and closures; a controller in data communication with the topographical profiler, the controller comprising a memory and a processor; and software comprising instructions that when loaded in the memory and executed by the processor instructs the topographical profiler to scan the monitored area, return to the controller a topographical profile map of the closure nest comprising vertical displacement data versus two mutually perpendicular directions in a plane of the surface, compares the vertical displacement data with data for the nest and closures from the data base, and deems a closure present or absent based on the comparison.

The data in the database may also cover predetermined upper and lower bounds for the vertical displacement of the nest, the closure nest and also optionally the container nest, and vertical displacement of the nest as measured by the topographical profiler may be compared with the upper and lower bounds for nest displacement in order to determine whether any warpage of the nest is within those bounds. If the warpage exceeds those bounds, then the nest may be discarded and another nest positioned in the monitored area.

The topographical profiler may be disposed outside the aseptic chamber. The nest handler may be an articulated arm apparatus. The articulated arm apparatus may be a robotic articulated arm apparatus. The nest handler may be a vacuum pickup system.

Figure 12:
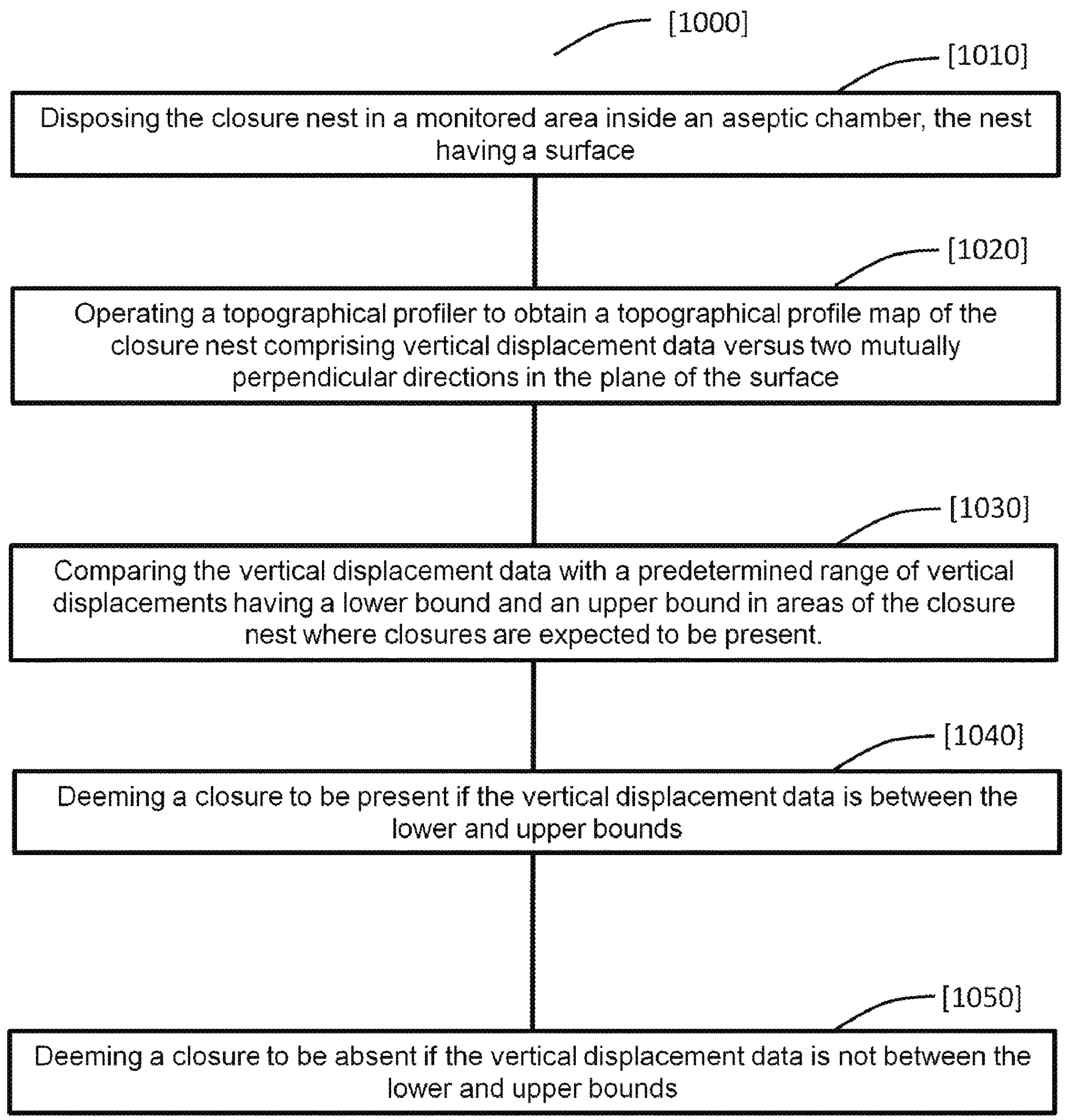
FIG. 12 shows a flow chart for a method of confirming the presence or absence of closures in a closure nest in an aseptic chamber.
Figure 13:
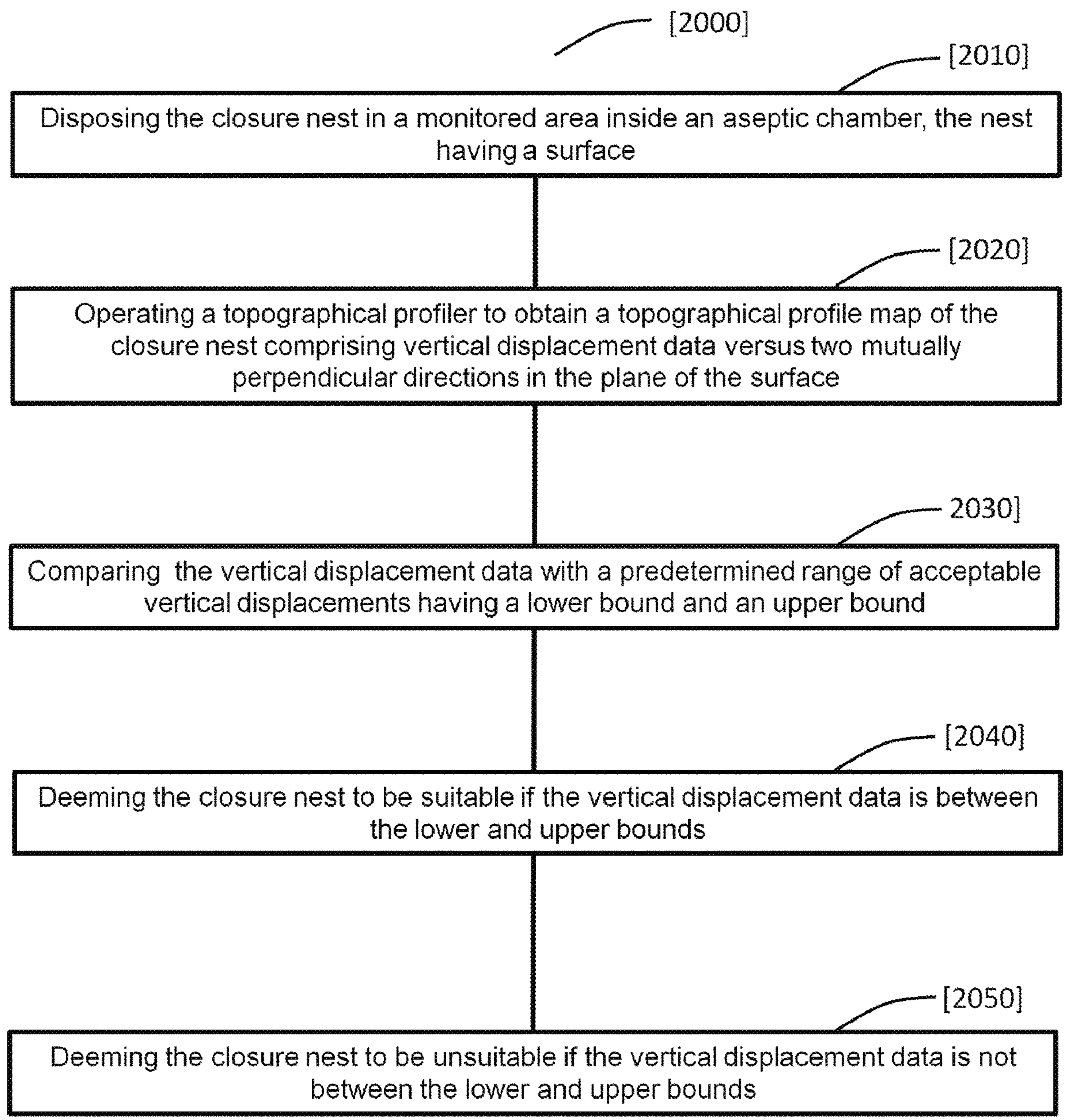
FIG. 13 shows a flow chart for a method of confirming in an aseptic chamber the suitability of a closure nest for use in closing containers with closures held in the closure nest.

In a further aspect method [1000] is provided at the hand of the flow chart in FIG. 12 for confirming the presence or absence of closures 120 in closure nest 100 inside aseptic chamber 20, the method comprising: disposing [1010] closure nest 100 in monitored area 29 inside aseptic chamber 20, closure nest 100 having a surface; operating [1020] topographical profiler (elements 37 and 41 together) to obtain a topographical profile map of closure nest 100 comprising vertical displacement data versus two mutually perpendicular directions in the plane of the surface; comparing [1030] the vertical displacement data with a predetermined range of vertical displacements having a lower bound and an upper bound in areas of closure nest 100 where closures 120 are expected to be present; deeming [1040] closure 120 to be present if the vertical displacement data is between the lower and upper bounds; and deeming [1050] closure 120 to be absent if the vertical displacement data is not between the lower and upper bounds.

Operating [1020] a topographical profiler may comprise operating the topographical profiler outside aseptic chamber 20. Disposing [1010] closure nest 100 in monitored area 29 may comprise operating an articulate arm apparatus. Operating an articulated arm apparatus may comprise operating robotic articulated arm apparatus 22. Disposing [1010] closure nest 100 in monitored area 29 may comprise operating vacuum pickup system 86.

Operating [1020] a topographical profiler may comprise translating closure nest 100. Comparing [1030] the vertical displacement data with a predetermined range of vertical displacements may comprise automatically comparing the vertical displacement data with a predetermined range of vertical displacements by means of suitable controller 51. Comparing [1030] the vertical displacement data with a predetermined range of vertical displacements may comprise providing controller 51 with the predetermined range of vertical displacements based on prior knowledge of closure nest 100 and closures 120.

The method [1000] may further comprise upon deeming closure 120 absent from closure nest 100 discarding closure nest 100 and disposing another closure nest with closures in monitored area 29.

The same topographical profile map obtained in step [1020] may also be employed to determine whether closure nest 100 or container nest 70 is warped beyond a predetermined tolerance. If closure nest 100 or container nest 70 is warped beyond that level of tolerance, then it is not suitable for the closing process evident from FIG. 1, FIG. 4, and FIG. 9, by which closure nest 100 and container nest 70 are aligned for closing containers 90 with closures 120 using actuated ram 44.

In another aspect method [2000] is provided for confirming in aseptic chamber 20 the suitability of closure nest 100 for use in closing nest 70 of containers 90, the method comprising: disposing [2010] closure nest 100 in monitored area 29 inside aseptic chamber 20, closure nest 100 having a surface; operating [2020] a topographical profiler to obtain a topographical profile map of closure nest 100 comprising vertical displacement data versus two mutually perpendicular directions in the plane of the surface; comparing [2030] the vertical displacement data with a predetermined range of acceptable vertical displacements having a lower bound and an upper bound; deeming [2040] closure nest 100 to be suitable if the vertical displacement data is between the lower and upper bounds; and deeming [2050] closure nest 100 to be unsuitable if the vertical displacement data is not between the lower and upper bounds. The method [2000] may further comprise upon deeming closure nest 100 to be unsuitable discarding closure nest 100 and disposing another nest with closures in the monitored area.

The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

As used in this disclosure, except where the context requires otherwise, the term "comprise" and variations of the term, such as "comprising," "comprises" and "comprised" are not intended to exclude other additives, components, integers or steps.

Also, it is noted that the embodiments are disclosed as a process that is depicted as a flowchart, a flow diagram, a structure diagram, or a block diagram. Although a flowchart may disclose various steps of the operations as a sequential process, many of the operations may be performed in parallel or concurrently. The steps shown are not intended to be limiting nor are they intended to indicate that each step depicted is essential to the method, but instead are exemplary steps only.

In the foregoing specification, the invention has been described with reference to specific embodiments thereof. It will, however, be evident that various modifications and changes may be made thereto without departing from the broader spirit and scope of the invention. The specification and drawing are, accordingly, to be regarded in an illustrative rather than a restrictive sense. It should be appreciated that the present invention should not be construed as limited by such embodiments.

From the foregoing description it will be apparent that the present invention has a number of advantages, some of which have been described herein, and others of which are inherent in the embodiments of the invention described or claimed herein. Also, it will be understood that modifications may be made to the device, apparatus and method described herein without departing from the teachings of subject matter described herein. As such, the invention is not to be limited to the described embodiments except as required by the appended claims.

What is claimed is:

1. A method for confirming the presence or absence of closures in a closure nest inside an aseptic chamber, the method comprising:

disposing the closure nest in a monitored area inside the aseptic chamber, the nest having a surface;

operating a topographical profiler to obtain a topographical profile map of the closure nest comprising vertical displacement data versus two mutually perpendicular directions in the plane of the surface;

comparing the vertical displacement data with a predetermined range of vertical displacements having a lower bound and an upper bound in areas of the closure nest where closures are expected to be present;

deeming a closure to be present if the vertical displacement data is between the lower and upper bounds; and deeming a closure to be absent if the vertical displacement data is not between the lower and upper bounds.

2. The method of claim 1, wherein operating the topographical profiler comprises operating the topographical profiler outside the aseptic chamber.

3. The method of claim 1, wherein disposing the closure nest in a monitored area comprises operating an articulated arm apparatus.

4. The method of claim 3, wherein operating an articulated arm apparatus comprises operating a robotic articulated arm apparatus.

5. The method of claim 1, wherein disposing the closure nest in a monitored area comprises operating a vacuum pickup system.

6. The method of claim 1, wherein operating a topographical profiler comprises profiling the closure nest.

7. The method of claim 1, wherein comparing the vertical displacement data with a predetermined range of vertical displacements comprises automatically comparing the vertical displacement data with a predetermined range of vertical displacements using a controller.

8. The method of claim 7, wherein comparing the vertical displacement data with a predetermined range of vertical displacements comprises providing the controller with the predetermined range of vertical displacements based on prior knowledge of the nest and the closures.

9. The method of claim 1, wherein deeming a closure to be present if the vertical displacement data is between the lower and upper bounds comprises deeming a stopper to be present if the vertical displacement data is between the lower and upper bounds; and deeming a closure to be absent if the vertical displacement data is not between the lower and upper bound comprises deeming a stopper to be present if the vertical displacement data is between the lower and upper bounds.

10. The method of claim 1, further comprising upon deeming a closure absent from the nest discarding the nest and disposing another nest with closures in the monitored area.

11. A method for confirming in an aseptic chamber the suitability of a closure nest for use in closing a nest of containers, the method comprising:

disposing the closure nest in a monitored area inside the aseptic chamber, the closure nest having a surface;

operating a topographical profiler to obtain a topographical profile map of the closure nest comprising vertical displacement data versus two mutually perpendicular directions in the plane of the surface;

comparing the vertical displacement data with a predetermined range of acceptable vertical displacements having a lower bound and an upper bound;

deeming the closure nest to be suitable if the vertical displacement data is between the lower and upper bounds; and deeming the closure nest to be unsuitable if the vertical displacement data is not between the lower and upper bounds.

12. The method of claim 11, further comprising upon deeming the nest unsuitable discarding the nest and disposing another nest with closures in the monitored area.

13. The method of claim 11, wherein disposing the closure nest in a monitored area comprises operating an articulated arm apparatus.

14. The method of claim 13, wherein operating an articulated arm apparatus comprises operating a robotic articulated arm apparatus.

15. The method of claim 11, wherein disposing the closure nest in a monitored area comprises operating a vacuum pickup system.

16. The method of claim 11, wherein operating a topographical profiler comprises profiling the closure nest.

17. The method of claim 11, wherein comparing the vertical displacement data with a predetermined range of vertical displacements comprises automatically comparing the vertical displacement data with a predetermined range of vertical displacements using a controller.

18. The method of claim 17, wherein comparing the vertical displacement data with a predetermined range of vertical displacements comprises providing the controller with the predetermined range of vertical displacements based on prior knowledge of the nest and the closures.

19. The method of claim 11, wherein deeming a closure nest to be suitable if the vertical displacement data is between the lower and upper bounds comprises deeming a stopper to be present if the vertical displacement data is between the lower and upper bounds; and deeming a closure nest to be unsuitable if the vertical displacement data is not between the lower and upper bound comprises deeming a stopper to be present if the vertical displacement data is between the lower and upper bounds.

20. The method of claim 11, further comprising upon deeming a closure nest to be unsuitable from the nest discarding the nest and disposing another nest with closures in the monitored area.

* * * * *